United States Patent
Scheiblecker et al.

(10) Patent No.: US 11,519,503 B2
(45) Date of Patent: Dec. 6, 2022

(54) ACTUATION DEVICE FOR ACTUATING AN EMERGENCY RELEASE OF THE TRANSMISSION OF A MOTOR VEHICLE, IN PARTICULAR OF A CAR

(71) Applicant: AUDI AG, Ingolstadt (DE)

(72) Inventors: Georg Scheiblecker, Kipfenberg-Böhming (DE); Bodo Wilke, Hitzhofen (DE); Maximilian Steffan, Manching (DE); Iris Puckelwaldt, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 311 days.

(21) Appl. No.: 16/755,963

(22) PCT Filed: Nov. 26, 2018

(86) PCT No.: PCT/EP2018/082599
§ 371 (c)(1),
(2) Date: Apr. 14, 2020

(87) PCT Pub. No.: WO2019/102010
PCT Pub. Date: May 31, 2019

(65) Prior Publication Data
US 2020/0300360 A1 Sep. 24, 2020

(30) Foreign Application Priority Data
Nov. 27, 2017 (DE) .................. 10 2017 221 201.2

(51) Int. Cl.
*F16H 63/00* (2006.01)
*F16H 63/34* (2006.01)
*F16H 25/20* (2006.01)

(52) U.S. Cl.
CPC ......... *F16H 63/3491* (2013.01); *F16H 25/20* (2013.01)

(58) Field of Classification Search
CPC ............................ F16H 63/3491; F16H 25/20
See application file for complete search history.

(56) References Cited

U.S. PATENT DOCUMENTS 8,408,088 B2* 4/2013 Park .................... F16H 63/3466
74/473.23
2006/0278029 A1 12/2006 Burgbacher

FOREIGN PATENT DOCUMENTS

| CN | 102313009 A | 1/2012 |
|---|---|---|
| CN | 103958945 A | 7/2014 |

(Continued)

OTHER PUBLICATIONS

Chinese Office Action dated Feb. 8, 2021, in connection with corresponding CN Application No. 201880076023.7 (11 pp., including machine-generated English translation).

(Continued)

*Primary Examiner* — Victor L MacArthur
(74) *Attorney, Agent, or Firm* — Maier & Maier, PLLC

(57) ABSTRACT

An actuating mechanism for actuating a gearbox emergency release of a gearbox of a motor vehicle having a parking lock and being mechanically locked by means of the parking lock when the parking lock is activated, having at least one actuating element fixed to the vehicle, by means of which the parking lock can be manually and mechanically deactivated, and having a tool formed separate from the actuating element, by which the actuating element can be manually and mechanically activated for the manual deactivating of the parking lock, wherein the tool comprises a threaded spindle and at least one corresponding movement element, which can be moved by a relative rotation between the threaded spindle and the movement element in translation along the threaded spindle and relative to it, in order to thereby actuate the actuating element.

20 Claims, 17 Drawing Sheets

(56) References Cited

FOREIGN PATENT DOCUMENTS

| | | |
|---|---|---|
| DE | 10241877 A1 | 3/2004 |
| DE | 102008036971 B3 | 10/2009 |
| DE | 102009019812 A1 | 11/2010 |
| DE | 102009028340 A1 | 2/2011 |
| DE | 102010008747 A1 | 8/2011 |
| DE | 102010029401 A1 | 12/2011 |
| DE | 102011119747 A1 | 6/2013 |

OTHER PUBLICATIONS

Examination Report dated Sep. 20, 2018 in corresponding German application No. 10 2017 221 201.2; 10 pages.
Examination Report dated Jan. 14, 2019 in corresponding German application No. 10 2017 221 201.2; 8 pages.
International Search Report and Written Opinion dated Feb. 4, 2019 in corresponding application No. PCT/EP2018/082599; 21 pages.
English-language translation of International Preliminary Report on Patentability dated Jun. 2, 2020, in corresponding International Application No. PCT/EP2018/082599; 9 pages.
Examination Report dated Jul. 13, 2020 in corresponding German Application No. 10 2017 221 201.2; 10 pages including partial machine-generated English-language translation.

* cited by examiner

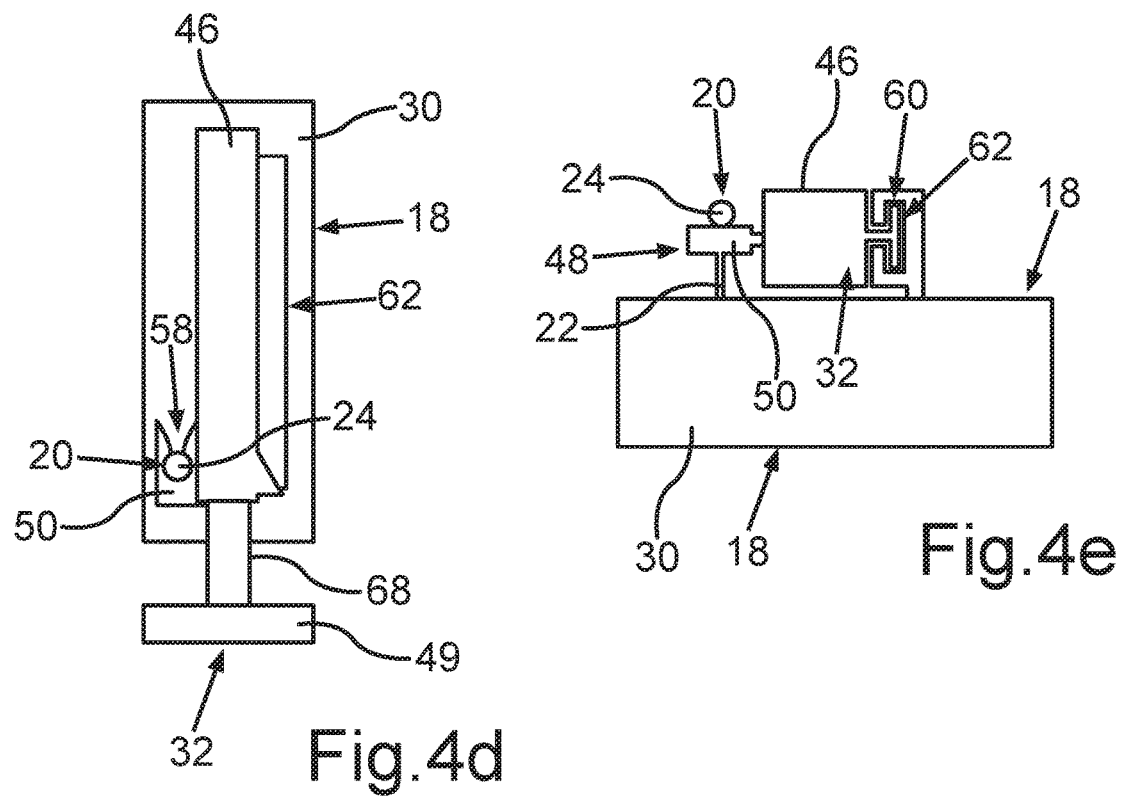
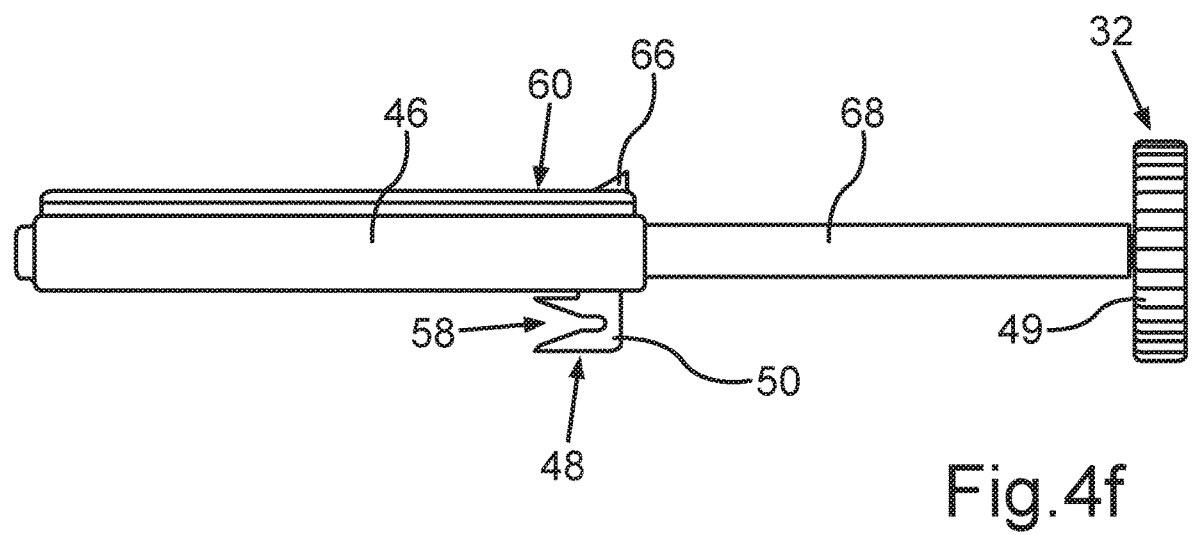

ACTUATION DEVICE FOR ACTUATING AN EMERGENCY RELEASE OF THE TRANSMISSION OF A MOTOR VEHICLE, IN PARTICULAR OF A CAR

FIELD

The disclosure relates to an actuating mechanism for actuating a gearbox emergency release of a gearbox of a motor vehicle, especially an automobile.

BACKGROUND

Such an actuating mechanism for actuating a gearbox emergency release of a gearbox of a motor vehicle comprising a parking lock, especially that of an automobile, is already known for example from DE 10 2011 119 747 A1. The gearbox may be designed as an automatic transmission and it is then mechanically locked by means of the parking lock when the parking lock is activated. By this is meant, in particular, that a gearbox output shaft of the transmission is secured against rotation relative to a housing of the gearbox, for example. In this way, the motor vehicle can be secured against unwanted rolling, for example, when the motor vehicle is parked on a slope.

The actuating mechanism comprises at least one actuating element fixed to the vehicle, by means of which the parking lock can be manually deactivated for example by a person. The actuating mechanism moreover comprises a tool formed separate from the actuating element, by which the actuating element can be manually and mechanically activated for the manual deactivating of the parking lock. The tool, for example, is at first spaced apart from the actuating element and can be moved, especially in a way relative to the actuating element, so that the tool can be brought to interact with the actuating element. The actuating element can then be activated manually by that person using the tool, so that the person can manually deactivate the parking lock.

Furthermore, DE 102 41 877 A1 discloses a gear selector for an automatic transmission of a motor vehicle, having an actuator, a drive element, a further drive element, at least one actuating lever, and an emergency actuating mechanism.

Moreover, DE 10 2009 019 812 A1 discloses a vehicle having a transmission which can engage various gears, a neutral condition, and a parking condition, since the transmission in the parking condition is locked by a locking element. Moreover, a manually actuated emergency release mechanism is provided, by which the transmission can be unlocked in event of a fault.

SUMMARY

The problem which the present invention proposes to solve is to create an actuating mechanism so that a gearbox of a motor vehicle can be especially easily manually and mechanically unlocked.

This problem is solved according to the disclosure by an actuating mechanism. Advantageous embodiments with expedient modifications are indicated in this disclosure.

The invention relates to an actuating mechanism for actuating a gearbox emergency release of a gearbox of a motor vehicle, especially an automobile and preferably a passenger car. The gearbox is for example designed as an automatic transmission, especially a converter automatic transmission, and it comprises a parking lock. If the parking lock is activated, the gearbox is mechanically locked by means of the parking lock. In this way, for example, the motor vehicle can be secured against unwanted rolling, especially when the motor vehicle is parked on a slope.

Usually the gearbox can be actuated through Shift-by-Wire, so that in particular the parking lock can be at least designed and deactivated with Shift-by-Wire. By this is meant in particular that an actuator is usually provided, especially an electrically operated actuator, and by means of the actuator the parking lock can be at least deactivated. For example, if a signal, especially an electrical signal is detected for the deactivating of the parking lock, the parking lock will be deactivated by means of the actuator. However, if a malfunction occurs, especially a power outage, so that the parking lock can no longer be electrically deactivated by means of the actuator, the parking lock can now be manually and mechanically deactivated by means of the gearbox emergency release. In this way, the motor vehicle can be moved and towed, for example, with no damage resulting, even during the malfunction. The gearbox emergency release is for example part of the actuator or vice versa, so that the parking lock for example can be deactivated via the actuator by means of the gearbox emergency release.

The actuating mechanism comprises at least one actuating element fixed to the vehicle, which is supported on the motor vehicle and thus is a fixed component of the motor vehicle. By means of the actuating element, the parking lock can be manually and in particular mechanically deactivated by a person. Furthermore, the actuating element comprises a tool formed separate from the actuating element, by which the actuating element can be manually and mechanically activated for the manual deactivating of the parking lock. By the feature that the tool is designed separate from the actuating element is meant in particular that the tool and the actuating element are two separately formed and thus respective components, which are not formed as a single piece with each other. For example, in a starting condition the actuating element is spaced away from the tool or vice versa, and the tool can be moved or brought into interaction with the actuating element so as to manually and mechanically actuate the actuating element via the tool and thereby deactivate the parking lock.

Now, in order to manually and mechanically deactivate the parking lock in especially simple manner, it is proposed according to the invention that the tool comprises a threaded spindle and at least one corresponding movement element, which can be moved by a relative rotation between the threaded spindle and the movement element in translation along the threaded spindle and relative to it, in order to thereby actuate the actuating element. In this way, the actuating element can be actuated in especially easy manner, for example manually by a person, in that the person for example rotates the threaded spindle and thereby produces a relative rotation between the threaded spindle and the movement element. In this way, only slight forces needed to be exerted by the person on the tool, especially on the threaded spindle, for the actuating of the actuating element and thus for the unlocking of the parking lock, in order to unlock, i.e., deactivate the parking lock, so that the parking lock can be deactivated in an especially easy and comfortable way.

In an advantageous embodiment of the invention, the actuating mechanism has at least one through opening, which is formed in a center console situated in the interior of the motor vehicle. In other words, the through opening of the actuating mechanism is a through opening of the center console, which is situated in the interior, especially in the fully manufactured state of the motor vehicle. The through opening has a passage direction running in a plane subtended by the vehicle transverse direction and the vehicle longitudinal direction, especially in the installed state of the center console or the actuating mechanism. The center console occupies its installed state in the fully manufactured condition of the motor vehicle, the center console being situated in the interior in the fully manufactured state of the motor vehicle. The passage direction of the through opening is a direction along which a fluid, such as gas or a narrow object can or could be inserted through the through opening. In particular, the passage direction runs, for example, at least substantially perpendicular to a passage plane in which the through opening runs. The passage plane is subtended, for example, by the vehicle longitudinal direction and the vehicle height direction. In this embodiment, it is possible in particular to deactivate the parking lock by means of the tool from the interior of the motor vehicle and thus in an especially easy manner. In particular, it is possible to deactivate the parking lock from the driver's seat and to hold it deactivated, so that for example a person located in the driver's seat can deactivate the parking lock and hold it deactivated, while at the same time the person can actuate for example a brake or a brake pedal of the motor vehicle and/or actuate a steering handle of the motor vehicle configured for example as a steering wheel so as to realize on the one hand a desired rolling of the motor vehicle, in that the person will deactivate the parking lock and hold it deactivated.

While the motor vehicle is rolling as desired with the parking lock deactivated, the person located in the driver's seat can actuate the brake and/or the steering handle in order to steer and/or slow down the motor vehicle as it is rolling. In this way, the motor vehicle can still be maneuvered upon failure of the parking lock or an actuator for actuating the parking lock.

The tool can pass through the through opening along the passage direction. In other words, the tool can penetrate into the through opening along the passage direction. Stated still otherwise, the tool for example in at least one state in which the parking lock is deactivated by means of the tool passes through the through opening along the passage direction. The tool can pass through the through opening along the passage direction in order to thereby bring the tool into interaction with the actuating element, thus mechanically actuating the actuating element and deactivating the parking lock. In this way, it is possible to unlock the parking lock from inside the motor vehicle, so that the parking lock can be unlocked especially comfortably and easily by a person located on the inside. In the installed condition or the fully manufactured condition of the motor vehicle, the through opening emerges for example at one end in the interior of the motor vehicle, so that a person located on the inside can actuate the tool from the inside in order to deactivate the parking lock from the inside.

On the other hand, at the other end the through opening emerges in an area situated outside the interior and on a side of the center console facing away from the interior, for example in the region where the actuating element or the gearbox is located. The tool can extend for example along the passage direction from the interior through the through opening and into the area, so that the actuating element can be manually operated with the tool from the inside. In this way, the parking lock can be manually and mechanically deactivated in especially easy manner, thereby unlocking the gearbox.

In order to deactivate the parking lock in an especially easy manner, it is proposed in another embodiment of the invention that the movement element can move in translation relative to the center console as a result of the relative rotation between the latter and the threaded spindle.

It has proven to be especially advantageous for the passage direction to run in the transverse direction of the vehicle. Thus, for example, the tool can be inserted through the through opening in the vehicle transverse direction and thus be brought into interaction with the actuating element, and thereby actuate the actuating element. In this way, the parking lock can be especially easily deactivated or unlocked.

It has proven to be especially advantageous for the tool to be designed as a tool separate from the center console, which can be pushed along the passage direction through the through opening in order to bring the tool into interaction with the actuating element and thereby mechanically actuate the actuating element and thus deactivate the parking lock. By this is meant in particular that the tool is not held on the center console, especially not on the motor vehicle as a whole, but rather the tool is a tool kit, for example, which can be moved around by a person freely with respect to the motor vehicle and especially with respect to the center console. In this way, for example, the tool can be especially advantageously stowed away. In order to deactivate the parking lock, the tool is moved for example by the person relative to the center console and relative to the actuating element, especially in such a way that the tool is pushed or inserted along the passage direction through the through opening. In this way, the tool can be brought into interaction with the actuating element so as to actuate the actuating element and thereby deactivate the parking lock.

The invention is based in particular on the following awareness: in many current vehicle designs or motor vehicles, there is no mechanical connection between a shift activation designed for example as a shift lever and a gearbox of the particular motor vehicle. Instead, commands of the driver of the respective motor vehicle are sent electronically to the gearbox via an operating element designed for example as a Shift-by-Wire operating element, that is, with no mechanical connection between the operating element and the gearbox. A mechanical implementing of the commands occurs, for example, through actuators, which receive the signals characterizing the commands and transform them accordingly into motions. In current designs, for example, electrical signals are sent to the gearbox by means of the shift activation from an actuator, especially with a transmission ratio, via a cable system. In event of a power loss, which may occur for example if a battery of the motor vehicle becomes disconnected, the gearbox is automatically locked by the activating of its parking lock. An unwanted rolling of the motor vehicle is not possible then. In order to release the parking lock, the gearbox emergency release is provided, especially with or without a transmission ratio, which engages for example with said actuator or directly with the gearbox.

In current gearboxes, the manual deactivating of the parking lock, also known as emergency unlocking, also normally occurs through a cable system or through a loop which may be part of the mentioned actuator and the gearbox emergency release. The cable system or the loop operates an internal emergency unlocking mechanism of the actuator and is usually located above the actuator and can thus be operated in the vehicle height direction. In order to reach such an unlocking system, usually a diaphragm of a center console has to be removed. After this, the cable or the loop can be moved into an unlocking position in order to thereby deactivate the parking lock. The unlocking position has to be held in order to keep the parking lock deactivated.

The unlocking position is held for example by exerting tension on the cable or the loop manually and thus by a person, or a corresponding marking tool is used. For example, in order to activate the parking lock, the cable or the loop is relaxed or the marking tool is removed.

Usually a force of up to 120 Newton is required to activate the cable or the loop. Whether a power transmission should be integrated in the emergency unlocking depends on the transmission options in the actuator.

Since it is now provided according to the invention to deactivate the parking lock manually and mechanically via the through opening of the center console and thus from the interior of the motor vehicle, a person deactivating the parking lock while deactivating the parking lock can at the same time actuate a brake operating element, such as one designed as a brake pedal, and thereby activate for example a service brake of the motor vehicle. In this way, despite the deactivating of the parking lock, an unwanted rolling of the motor vehicle can be avoided at least temporarily. Moreover, a rolling or movement of the motor vehicle after the deactivating of the parking lock can be steered by the person using the service brake. Thanks to the possibility of unlocking the parking lock via the through opening of the center console, the actuating mechanism can be situated within reach of the driver, so that the driver can deactivate the parking lock and at the same time actuate the service brake.

Moreover, it is possible with the actuating mechanism according to the invention to apply even large forces required for activating the parking lock in an easy manner, in particular by a power transmission. In particular, the following shortcomings have been identified in traditional gearbox emergency releases:

- design incompatibility; access should be provided through the center console for example via storage compartments or beverage holders, otherwise the center console has to be taken out in order to reach the emergency unlocking. Hence, no direct access to the emergency unlocking. Moreover, damage to the diaphragms being removed is not ruled out.
- depending on design criteria, an asymmetrical configuration of the center console in the area of the actuator can only be done at great cost, if at all. Likewise, it is necessary to provide right hand/left hand steering variants.
- the unlocking position should be secured with the aid of a special marking tool or by permanent manual holding.
- the unlocking position is not recognizable at first glance and might not be remembered.
- the overall unlocking force needs to be applied manually.
- high cost for functional integration in the motor vehicle
- costly design measures
- laborious, costly laying of cables
- laborious, cost-intensive servicing solutions
- no unified modules possible for different variants such as front, rear, central engine concepts The aforementioned shortcomings can now be avoided by means of the actuating mechanism according to the invention, since the parking lock can be deactivated with the aid of the tool, fashioned for example as a tool kit. The through opening may constitute a design-neutral access, especially on the side of the center console and for example at the height of a seat rail screw connection, it being especially easy to deactivate, hold, and then reactivate the parking lock via the through opening.

The through opening for example may be associated with a cover element designed in particular as a lid or the like, by means of which the through opening is or can be closed, in particular completely closed. For example, in order to deactivate the parking lock, the cover element is removed, so that the cover element exposes the through opening. After this, the tool can be brought into interaction with the actuating element via the through opening. After this, for example, the tool can be removed from the through opening, whereupon the through opening can be closed once again by means of the cover element. Depending on the design, an actuating mechanism for example can be integrated in the tool for actuating the actuating element or arranged on the actuator as a separate component. The actuating mechanism for example provides a transmission ratio other than 1, by means of which forces or torques applied by a person to the tool can be converted into larger forces or torques. In this way, even slight forces or torques applied to the tool by the person are enough to actuate the actuating element and thus deactivate the parking lock.

The actuating element comprises for example a traction means, especially one in the form of a cable, also known as a Bowden cable, a rope, a band, a flex shaft, or the like. By means of the tool, the cable for example can be grasped and securely manually and mechanically activated in order to deactivate the parking lock via the cable. If a power transmission of the actuator is utilized in order to deactivate the parking lock via the power transmission, forces of only up to 120 Newton for example are enough to deactivate the parking lock. The parking lock can then be easily and comfortably operated from the interior. In particular, the following benefits can be realized by means of the actuating mechanism according to the invention:

- good design compatibility in the area of the center console, since the through opening affords access for example at the side of the center console. In this way, the design freedom at the center console is preserved, since no access through storage compartments or beverage containers on top of the actuator is required.
- easy operation and ergonomically favorable positioning of the actuating mechanism and thus of the gearbox emergency release
- minimal cost expenditure in the center console for accessibility of the actuating mechanism and thus of the emergency unlocking
- tool for operating the emergency unlocking can be easily accommodated in the tool kit
- minimal time and cost for servicing
- the access (through opening) is realized at the side of the center console and covered by a small lid. This can be adapted to the specific make of the center console as a cap component and is located quite unobtrusively outside the direct visual field of the driver. The access or the closure cap or the through opening can likewise be positioned by the driver or passenger.
- the unlocking position is maintained specifically and automatically within or by means of the tool kit and need not be secured with a separate marking tool or by manual holding. The unlocking occurs by simply removing the tool.
- the unlocking position is clearly identifiable on the inserted tool kit at the side of the center console.
- the unlocking tool as well as the design of the emergency unlocking on the actuator can cover all makes and models and thus be unified with cost advantage.
- the recognition feature of the emergency unlocking activation is identical for all makes and models.

thanks to the power transmission of the actuation mechanism, the required activating force for the unlocking is easily produced and overcome Moreover, the following requirements can be met in the actuating mechanism according to the invention:
- accessibility for simple tool (in cases with integrated power transmission)
- design for actuator especially for sideways inserting of the tool
- design of the center console with side hole and no cover for the tool, for example
- minimal interior design impact
- easy and ergonomical use
- additional variant positioning possibilities for the actuator
- testing of application possibilities, especially for sports cars, sedans, and allterrain vehicles
- all factors and premises taken into account for widespread use It has furthermore been found to be especially advantageous for the tool to be designed as a tool fixed to the vehicle, being supported at least indirectly, especially directly, on the center console and able to move, especially to swivel, particularly relative to the center console. The tool passes through the through opening in at least one position in which the tool can move relative to the center console, especially in order to actuate the actuating element. This realizes a distinct and defined positioning of the tool, so that the tool can be located quickly and easily and comfortably and be used or operated for deactivating the parking lock.

Another embodiment is characterized in that a guide mechanism is provided, comprising a first guide element provided on the tool, especially on a housing of the tool, and a second guide element secured at least indirectly on the center console, which can be brought into form-fitted interaction with the first guide element for the guiding of the tool when the tool is inserted through the through opening. In other words, if the tool is inserted through the through opening, the guide elements will come into a form-fitted interaction, for example, such that one of the guide elements is inserted into the other guide element. In this way, the tool is then guided by means of the guide elements when the tool is inserted through the through opening and hence is moved in translation relative to the center console. In this way, the tool can be guided in targeted and defined manner by means of the guide elements in the direction of the actuating element or toward the actuating element, so that for example a person performing the deactivating of the parking lock does not have to spend time and effort in finding the actuating element. Consequently, the parking lock can be deactivated in especially easy and comfortable manner.

The tool comprises for example a housing in which the threaded spindle is arranged at least partly, especially at least predominantly or entirely. The threaded spindle can turn about an axis of rotation relative to the housing and relative to the movement element. The first guide element is for example arranged on the housing, especially directly so, and in particular it is situated on or at an outer side of the housing facing away from the threaded spindle.

The movement element comprises, for example, a screw element fashioned as a nut, having for example a first thread in the form of an internal thread. The threaded spindle has for example a second thread in the form of an external thread, corresponding to the internal thread, and the screw element is screwed onto the threaded spindle by the internal thread and the external thread. The screw element is braced against the housing at least indirectly, especially directly, such that the screw element is secured against rotation relative to the housing about the axis of rotation. However, the screw element can move, i.e., be displaced in translation along the threaded spindle and thus along the axis of rotation relative to the threaded spindle and relative to the housing. Now, if the threaded spindle is turned about the axis of rotation relative to the housing, for example manually by a person, the screw element screwed onto the threaded spindle will not rotate along with the threaded spindle about the axis of rotation relative to the housing, since the screw element is secured against a rotation relative to the housing about the axis of rotation. Consequently, a relative rotation will occur between the screw element and the threaded spindle, so that the threaded spindle will turn about the axis of rotation relative to the screw element. This relative rotation between the screw element and the threaded spindle is transformed by means of the thread into a translatory movement of the screw element, which moves in the course of the translatory movement along the threaded spindle and thus along the axis of rotation relative to the threaded spindle and relative to the housing.

This translatory movement of the screw element is accompanied by a translatory movement of the movement element, so that the actuating element can be operated by means of the movement element. The movement element comprises for example at least one carriage, joined to the screw element, and extending for example from the screw element and thus from an interior of the housing out into its surroundings. For this, the housing has for example a through opening, which is formed in particular as a slot. The carriage passes through the slot, so that the carriage extends from the screw element out to the surroundings of the housing. The slot is preferably linear or straight and runs preferably at least substantially parallel to the axis of rotation or to the threaded spindle. In particular, it is possible for the screw element to be braced by the carriage against at least one wall region of the housing at least partly bordering on the slot, or to be able to be braced in this way, and thereby secured against a rotation relative to the housing about the axis of rotation. By turning the threaded spindle relative to the screw element and the resulting translatory relative movement to the screw element or the movement element and the housing, the carriage moves into the slot along the slot, so that at least a portion of the carriage is moved in translation outside the housing and relative to it, while inside the housing the screw element is moved in translation relative to the housing. In this way, for example, the movement element can be brought to interact by the carriage with the actuating element located outside the housing and to operate the actuating element.

For example, in order to bring the movement element into interaction with the actuating element, in order to then actuate the actuating element and operate the actuating element and thereby hold the parking lock deactivated, the threaded spindle is turned for example in a first direction of turning about the axis of rotation relative to the housing. In this way, for example, the movement element is moved in translation along the threaded spindle in a first direction. Then, in order to again activate the parking lock and/or to move the movement element out of interaction with the actuating element, for example, the threaded spindle is turned in a second direction of turning, opposite the first direction of turning, by which the movement element is moved in translation along the threaded spindle in a second direction, opposite the first direction. In this way, the parking lock can be easily and comfortably, as well as optionally, activated and deactivated.

In order to actuate the threaded spindle in an especially easy and comfortable manner by a person, for example manually, the tool comprises an operating element, for example designed as a rotary knob, which is rotationally fixed to the threaded spindle. The operating element, which is preferably situated outside the housing, has a larger outer circumference than the threaded spindle, especially a larger outer diameter, so that a person can grasp the operating element by one hand in especially comfortable and easy manner, and the threaded spindle can be turned manually with little effort through the operating element. In this way, the parking lock can be easily and comfortably deactivated.

In order to deactivate the parking lock in an especially easy and thus quick manner, it is proposed in a further embodiment of the invention that the movement element, especially the carriage, has a receptacle for catching and holding the actuating element. The receptacle is configured for example to be open in the aforementioned first direction and closed in the second direction, so that the actuating element can be arranged in especially easy manner in the receptacle and thus be caught by means of the receptacle, so that the movement element is moved in the first direction. The actuating element then comes to bear against a wall of the movement element, especially the carriage, bounding the receptacle in the second direction, so that if the movement element is moved further in the first direction the actuating element will be operated, for example. In particular, it is conceivable for the receptacle to widen in the first direction and thus to narrow in the second direction. In this way, for example, at least one or more slanting entrance surfaces or entrance bevels slanting in the first direction are formed, assisting the entrance process. In this way, the actuating element can be arranged especially easily in the receptacle and thus be caught by means of the receptacle.

Finally, it has proven to be especially advantageous for the actuating element to comprise a fitting, which can be brought into form-fitted interaction with the movement element in order to mechanically actuate the actuating element. The fitting preferably has a larger outer circumference, especially a larger outer diameter, than a partial region of the actuating element which adjoins the fitting, so that the actuating element can be for example easily caught and thus received in the receptacle. Thanks to the fitting, the actuating element can interact especially advantageously by form fit with the movement element, so that the parking lock can be deactivated especially easily.

BRIEF DESCRIPTION OF THE DRAWING

The invention also encompasses combinations of the specified embodiments. In the following, exemplary embodiments of the invention shall be described. There are shown:

FIG. 4d portions of a schematic top view of the actuating mechanism according to the first embodiment;

FIG. 4e portions of a schematic rear view of the actuating mechanism according to the first embodiment;

FIG. 4f a schematic side view of a tool of the actuating mechanism according to the first embodiment;

DETAILED DESCRIPTION

The following exemplary embodiments are preferred embodiments of the invention. In the exemplary embodiments, the components described for the embodiments each time constitute individual features of the invention to be viewed independently of each other, which also modify the invention independently of each other and thus should also be regarded as part of the invention in themselves or in a different combination than the one illustrated. Furthermore, the described embodiments may also by amplified by other of the already described features of the invention. In the figures, functionally identical elements are given the same reference numbers each time.

Figure 1:
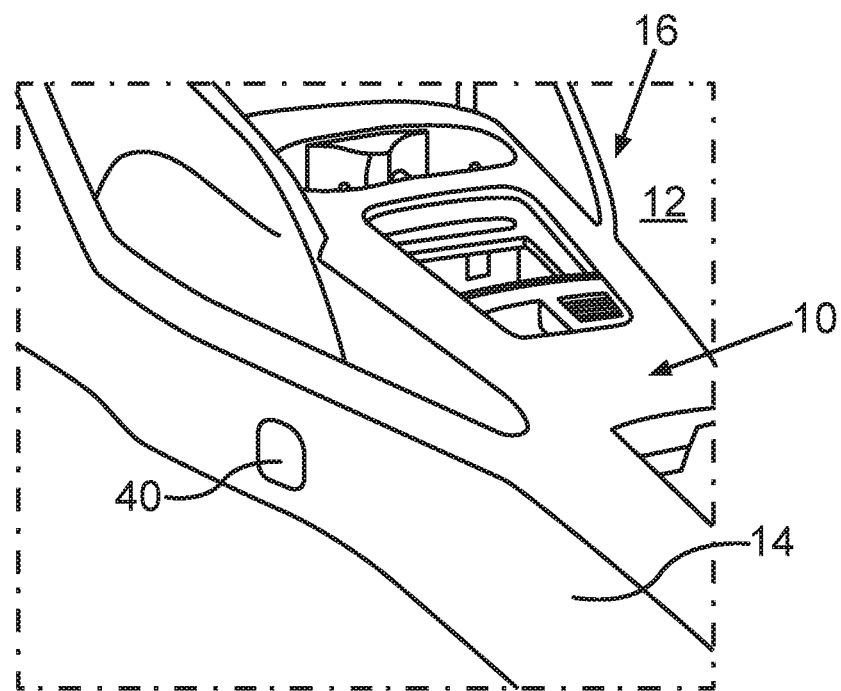
FIG. 1 a portion of a schematic perspective view of a center console of an actuating mechanism for a motor vehicle.
Figure 4A:
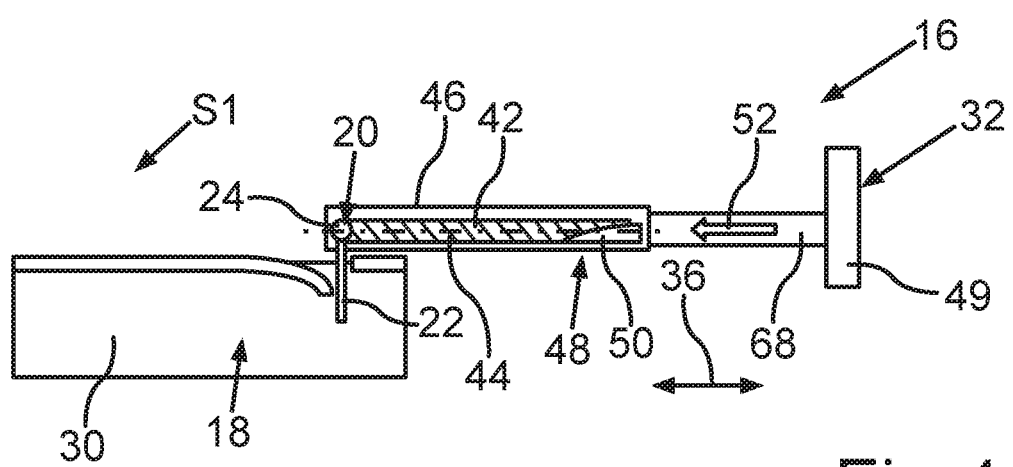
FIG. 4a a portion of a schematic and sectioned side view of an actuating mechanism according to the disclosure in a first embodiment, comprising for example the center console of FIG. 1 and FIG. 2.

FIG. 1 shows a portion of a schematic perspective view of a center console 10 of a motor vehicle, preferably configured as a passenger car, the center console 10 in FIG. 1 being shown in its installed position. The center console 10 takes up its installed position as shown in FIG. 1 in the fully manufactured condition of the motor vehicle. In this fully manufactured condition of the motor vehicle, the center console 10 is arranged in the interior 12 of the motor vehicle. The center console 10 comprises, for example, a side wall 14, by which the foot space of the driver or passenger of the motor vehicle is bounded in the vehicle transverse direction, especially from the foot space of the passenger or driver of the motor vehicle, at least partially, especially at least predominantly or entirely. The center console 10 is part of an actuating mechanism, denoted overall as 16, which shall be illustrated more closely below. For example, FIG. 4a-o show a first embodiment of the actuating mechanism 16, and the center console 10 is or can be used in the first embodiment.

The actuating mechanism 16 serves for mechanically and manually deactivating a gearbox emergency release and, through this, a parking lock of a gearbox of the motor vehicle, thereby unlocking it. The motor vehicle in its fully manufactured condition comprises the gearbox and at least one drive engine, wherein the motor vehicle or at least one wheel of the motor vehicle can be driven by the drive engine across the gearbox. For this, the gearbox comprises at least one gearbox housing and a gearbox output shaft, which is coupled for example to the at least one wheel. The gearbox output shaft is at least partly received in the housing and can turn basically about an axis of rotation relative to the housing. The mentioned parking lock can be activated or engaged and deactivated or disengaged. If the parking lock is engaged, the gearbox output shaft is secured against a turning relative to the housing about the axis of rotation, so that the gearbox output shaft and hence the wheel cannot turn about the axis of rotation relative to the housing. This avoids an unwanted rolling of the motor vehicle, especially when the motor vehicle has been stationed or parked on a slope. If the parking lock is deactivated or disengaged, the parking lock releases the gearbox output shaft for a turning about its axis of rotation relative to the housing. Thus, the gearbox is mechanically locked when the parking lock is activated.

Figure 3:
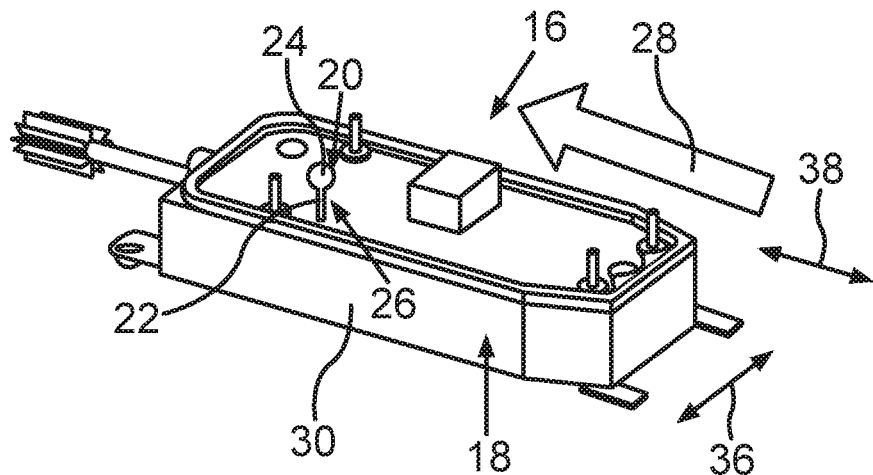
FIG. 3 a schematic perspective view of an actuator for actuating a parking lock of the gearbox.

FIG. 3 shows an actuator 18, which is for example an electrically operated actuator and for this it has for example at least one electric motor. By means of the actuator 18, the parking lock can be at least electrically deactivated or disengaged. For this, the actuator 18 is energized with electric current. In this way, it is possible to deactivate the parking lock, for example, when a person located in the interior 12 activates an operating element situated in the interior 12 for deactivating the parking lock, without there being provided for this a direct mechanical connection between the operating element and the parking lock. If the person activates the operating element, an electrical signal characterizing the activation of the operating element will be detected when the motor vehicle is in proper working condition. Due to the detecting of the signal, the actuator 18 is actuated so as to deactivate the parking lock by means of the actuator 18 thanks to the actuating of the actuator 18. Since the parking lock can thus be deactivated without a mechanical connection being present between the operating element and the parking lock, a Shift-by-Wire activation of the parking lock is provided.

But now if the parking lock is at first activated and there occurs a power outage and thus a malfunctioning of the motor vehicle, so that neither the mentioned electrical signal can occur nor can the actuator 18 be electrically operated after the activating of the operating element, the gearbox emergency release and through this the parking lock can be manually and mechanically activated by means of the actuating mechanism 16 through a person located in the interior 12, so that the parking lock is manually and mechanically deactivated. The gearbox emergency release here is part of the actuator 18, for example.

For this, the actuating mechanism 16 comprises for example at least one actuating element 20 fixed to the vehicle, which is especially visible in FIG. 3, by means of which or through which the parking lock can be manually and mechanically deactivated. In the exemplary embodiment illustrated in FIG. 3, the actuating element 20 comprises for example a traction means in the form of a cable 22, also known as a Bowden cable. Furthermore, the actuating element 20 comprises for example a fitting 24, also known as a head, which is arranged at one end 26 of the cable 22 and is joined to the cable 22. In order to deactivate the parking lock, a force formed in particular as a tensile force is exerted on the actuating element 20. The tensile force is transmitted by the actuating element 20 at least indirectly to the parking lock, thereby mechanically and manually deactivating the parking lock. In order to transmit the force to the actuating element 20 and then to the parking lock, one pulls on the actuating element 20. Moreover, an arrow 28 in FIG. 3 shows the forward direction of travel of the motor vehicle.

In particular, the actuating element 20 is coupled to the parking lock by an actuation mechanism of the actuator 18, not shown in FIG. 3 and received for example in a housing 30 of the actuator 18, so that the parking lock can be mechanically and manually deactivated, that is, disengaged, by means of the actuating element 20 through the actuation mechanism. The actuation mechanism is for example a gearing or it has a transmission ratio different from 1. In this way, for example, forces or torques exerted by the person manually on the actuating element 20 can be transformed into larger forces or torques acting on the parking lock. In this way, the parking lock can also be deactivated with only slight forces or torques exerted manually by the person on the actuating element 20, so that the parking lock can have a simple and comfortable design.

Figure 4B:
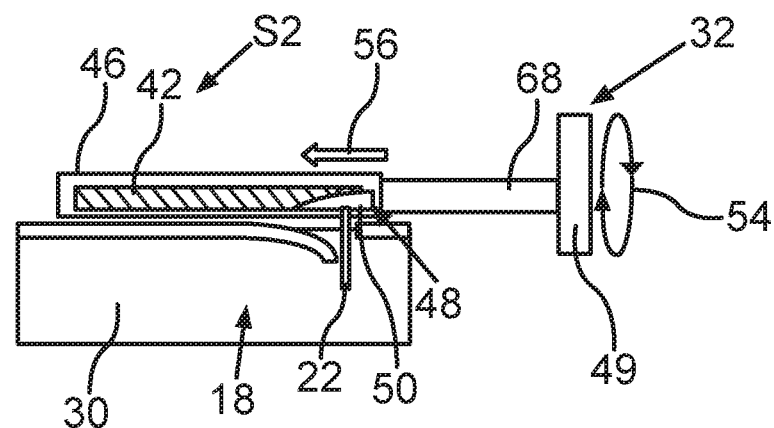
FIG. 4b a portion of a schematic and sectioned side view of an actuating mechanism according to the disclosure in a first embodiment, comprising for example the center console of FIG. 1 and FIG. 2.
Figure 4C:
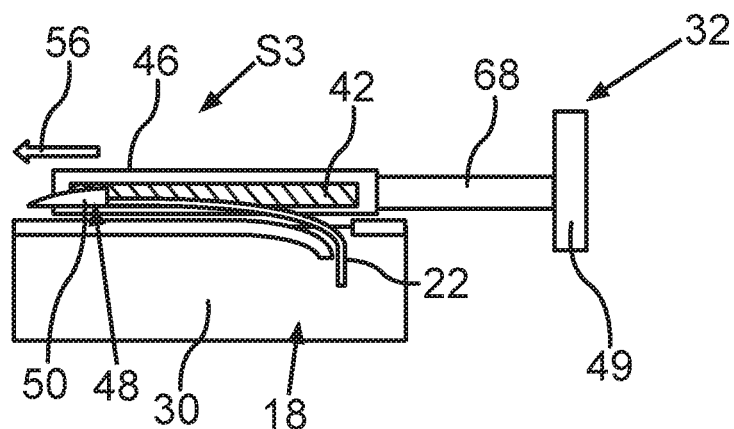
FIG. 4c a portion of a schematic and sectioned side view of an actuating mechanism according to the disclosure in a first embodiment, comprising for example the center console of FIG. 1 and FIG. 2.
Figure 4G:
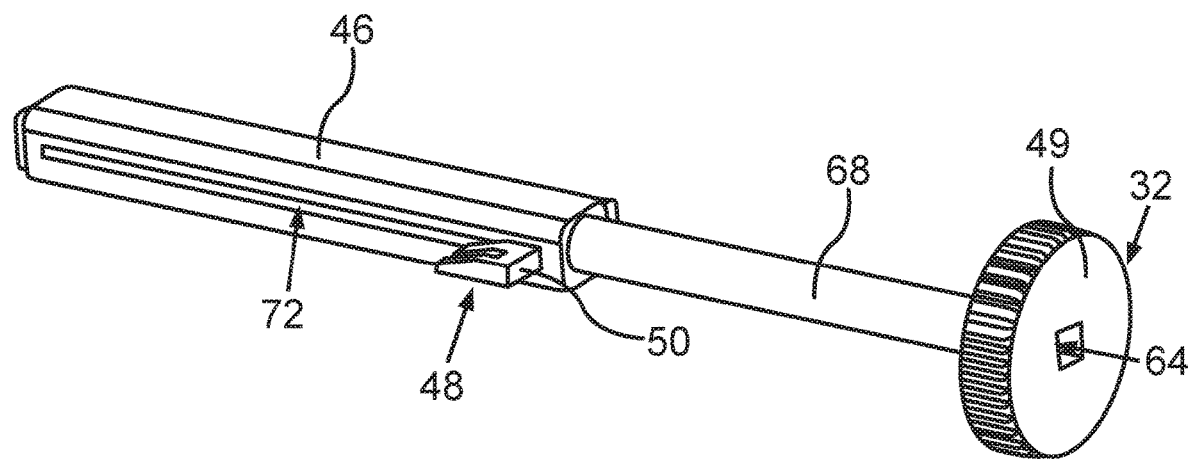
FIG. 4g a portion of a schematic perspective view of the tool per FIG. 4f.

The actuating mechanism 16 furthermore comprises a tool 32, especially well shown in FIG. 4a-c, and designed separate from the actuating element 20, by which the actuating element 20 can be manually and mechanically activated for the manual deactivating of the parking lock. In other words, the person can grasp the tool 32 and use the tool 32 to manually and mechanically actuate the actuating element 20, thereby manually and mechanically deactivating the parking lock. In this way, the parking lock can also be deactivated during a power outage. By the feature that the tool 32 is designed separate from the actuating element 20 is meant in particular that the actuating element 20 and the tool 32 are designed as at least two components formed separately from each other, which interact with each other in order to actuate the actuating element 20 by means of the tool 32.

Figure 2:
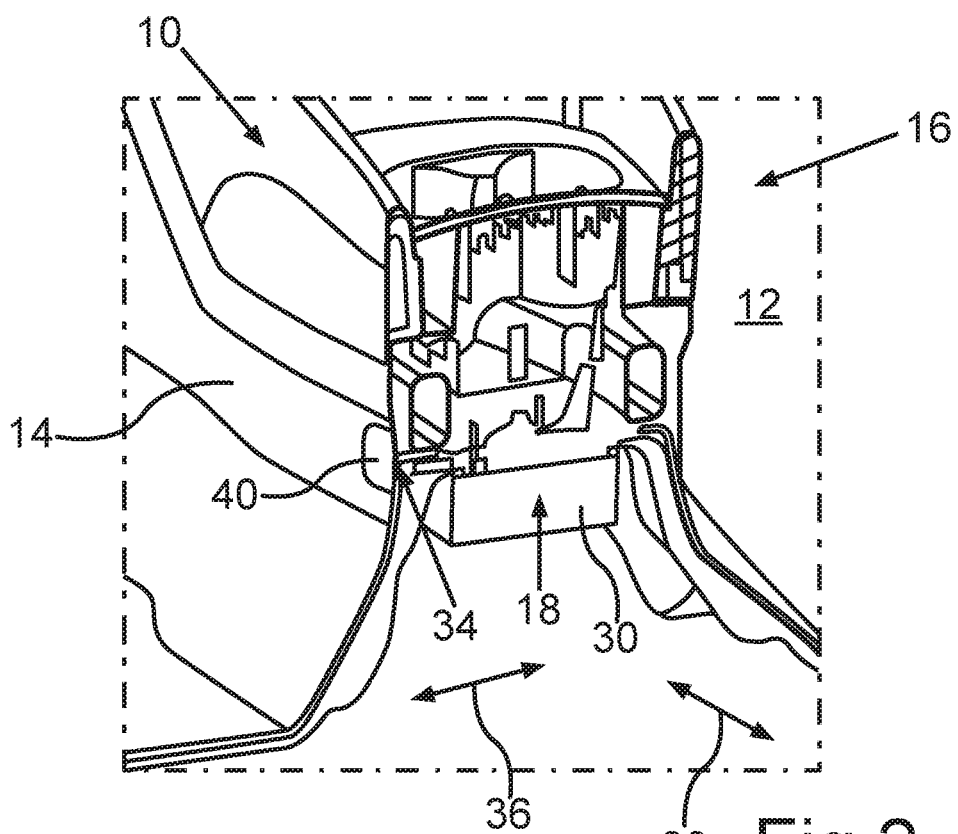
FIG. 2 a portion of a schematic and perspective side view of the center console.

Now, in order to deactivate the gearbox emergency release and through this the parking lock in an especially easy and comfortable manner, especially manually and mechanically, the actuating mechanism 16 comprises at least one through opening 34, especially well shown in FIGS. 1 and 2, which is formed in the center console 10 which is or can be situated in the interior 12 of the motor vehicle and in the side wall 14, and which has a passage direction indicated by a double arrow 36 in FIG. 2. The passage direction runs in an imaginary plane subtended by the vehicle transverse direction and the vehicle longitudinal direction, the vehicle longitudinal direction in FIG. 2 being illustrated by a double arrow 38 and coinciding with the forward direction of travel, illustrated by the arrow 28 in FIG. 3. In the first embodiment or the exemplary embodiment illustrated in FIGS. 1 and 2, the passage direction of the through opening 34 runs along the vehicle transverse direction or the passage direction coincides with the vehicle transverse direction, so that in FIG. 2 the vehicle transverse direction is illustrated by the double arrow 36. The tool 32 can pass through the through opening 34 along the passage direction, thereby bringing the tool 32 into interaction with the actuating element 20, in order to mechanically and manually actuate the actuating element 20 and thereby mechanically and manually deactivate the parking lock.

In the first embodiment, the tool 32 is designed as a tool separate from the center console 10, which is pushed in or along the passage direction through the through opening 34 in order to bring the tool 32 into interaction with the actuating element 20. It is especially well shown in FIGS. 1 and 2 that the through opening 34 is associated with a cover element 40, for example fashioned as a lid, by means of which the through opening 34 is or can be closed. In particular, the cover element is held reversibly releasable on the center console 10. In order to move the tool 32 in the passage direction relative to the center console 10 and insert it through the through opening 34, the cover element 40 is removed from the through opening 34, so that the through opening 34 is exposed.

It can be seen from FIG. 1 that an access to the actuating element 20 is provided through the through opening from the right and left in the vehicle transverse direction, for example in the exemplary embodiment illustrated in FIG. 1. Alternatively, the access can be from the right side or via a removable component or diaphragm. The through opening 24 may be left entirely open. The cover element 44 could also be for example a multifunction holder on which objects can be held or hung, for example.

In the first embodiment, the tool 32 comprises a threaded spindle 42, which can turn for example about an axis of rotation 44 relative to a housing 46 of the tool 32. The tool 32 comprises the housing 46, in which the threaded spindle 42 is received at least partly, especially at least predominantly or entirely. The tool 32 moreover comprises an operating element 49, for example one fashioned as a rotary knob, b which for example the threaded spindle 42 can be turned about the axis of rotation 44 relative to the housing 46. The tool 32 moreover comprises a movement element 48, which can move, that is, be displaced in translation by a relative rotation between the threaded spindle 42 and the movement element 48 along the threaded spindle 42 and thus along the axis of rotation 44 relative to the center console 10 and relative to the housing 46, thereby actuating the actuating element 20. The movement element 48 comprises for example a nut, not shown in the figure, which is screwed onto the threaded spindle 42. Moreover, the movement element 48 comprises for example a carriage 50. The movement element 48 is secured for example against a turning about the axis of rotation 44 relative to the housing 46. Thus, for example, if the threaded spindle 42 is turned, especially by the rotary knob, about the axis of rotation 44 relative to the housing 46, the movement element 48 will not turn with it about the axis of rotation 44 relative to the housing 46. The threaded spindle 42 has an external thread, and the movement element 48, especially the nut, has an internal thread corresponding to the external thread. The threaded spindle 42 and the nut are screwed together by the external thread and the internal thread. In other words, the nut is screwed for example by its internal thread via the external thread onto the threaded spindle 42. The external thread and the internal thread are also known as the thread. By means of the thread, the described relative rotation between the threaded spindle 42 and the movement element 48, especially the nut, is transformed into a translatory movement of the movement element 48 along the axis of rotation 44 relative to the housing 46.

In a first step S1, which can be seen in FIG. 4a, the tool 32 is inserted for example along the passage direction through the through opening 34. In this way, the actuating element 20, especially the fitting 24, is inserted into the housing 46 and brought in particular into an interaction, especially a form-fitted interaction, with the movement element 48, especially with the carriage 50. For this, the carriage 50 has for example a recess, in which the fitting 24 comes to rest. This inserting of the tool 32 into or through the through opening 34 is illustrated in FIG. 4*a* by an arrow 52. After this—as illustrated in FIG. 4*b* by an arrow 54—the threaded spindle 42 is turned about the axis of rotation 44 relative to the housing 46 and relative to the movement element 48 in a second step S2, illustrated in FIG. 4*b*. In this way, the movement element 48 is moved along the axis of rotation 44 relative to the housing 46—as illustrated in FIG. 4*b* by an arrow 56.

Since the carriage 50 interacts by form fit with the fitting 24 and thus with the actuating element 20, a force formed especially as a tensile force is exerted on the actuating element 20 by the described moving of the movement element 48 in a third step S3, shown in FIG. 4*c*. In the first embodiment, the cable 22 is pulled across the fitting 24, by which the parking lock is deactivated or unlocked. This is illustrated in FIG. 4*c*. On the whole, it is evident from FIG. 4*a-c* that the tool 32 in a condition in which the parking lock is unlocked by means of the tool 32 passes through the through opening 34 in the vehicle transverse direction or along the passage direction.

The fitting 24 for example is a flex shaft, which is grasped and finally pulled in the described manner by the carriage 50, configured for example as a catching hook. In the described manner, for example, the actuating element 20 is moved into an unlocking position, in which the parking lock is deactivated. Preferably, the threaded spindle 42 has self-locking, so that the movement element 48 and the actuating element 20 are held in the unlocking position by the self-locking. In this way, the parking lock is held deactivated by the self-locking of the threaded spindle 42.

The parking lock in particular is unlocked or deactivated in that the threaded spindle 42 is turned in a first direction of rotation about the axis of rotation 44 relative to the housing 46. In order to lock or activate the parking lock once more, the threaded spindle 42 is turned for example by the operating element 49 in a second direction of rotation about the axis of rotation 44 relative to the housing 46, opposite the first direction of rotation. In this way, the movement element 48 is retracted from the unlocking position, so that the actuating element 20 can also be retracted. As a result, the parking lock is once more activated. Alternatively or in addition, it is conceivable to activate the parking lock in such a way that the tool 32 is simply pulled out from the through opening 34 once again.

It is especially well shown in FIG. 4*d* that the carriage 50 can be configured as a catching hook. The carriage 50 for example has the mentioned recess, denoted as 58 in FIG. 4*d*, which is open in particular along the passage direction. In this way, the actuating element 20 can be moved into the recess 58 by moving the tool 32 along the passage direction relative to the actuating element 20.

It is especially well shown in FIG. 4*e* that the tool 32 comprises a first guide element 60. The guide element 60 is provided for example on the housing 46 and has for example an at least substantially T-shaped cross section. On the actuator 18 there is provided a second guide element 62, into which the guide element 60 can be inserted along the passage direction. The guide elements 60 and 62 may cooperate by form fitting, such that the tool 32 when inserted or pushed through the through opening 34 is guided in defined manner.

Especially well shown in FIG. 4*f* is the operating element 49, fashioned as a rotary knob, which can be especially easily activated by hand and can thereby be turned about the axis of rotation 44 relative to the housing 46. It is especially well shown in FIG. 4*g* that the operating element 49 has a tool socket 64, especially one formed as a square socket, particularly a polygon socket, by which the operating element 49 and thus the threaded spindle 42 can interact by form fitting with a turning tool or screw driver, such as a drill. By means of the turning tool, torques can be exerted in form fitting manner on the operating element 49 and thus on the threaded spindle 42, for example in order to turn the threaded spindle 42 by means of the turning tool about the axis of rotation 44 relative to the housing 46. In this way, the parking lock can be unlocked especially quickly and easily.

Figure 4H:
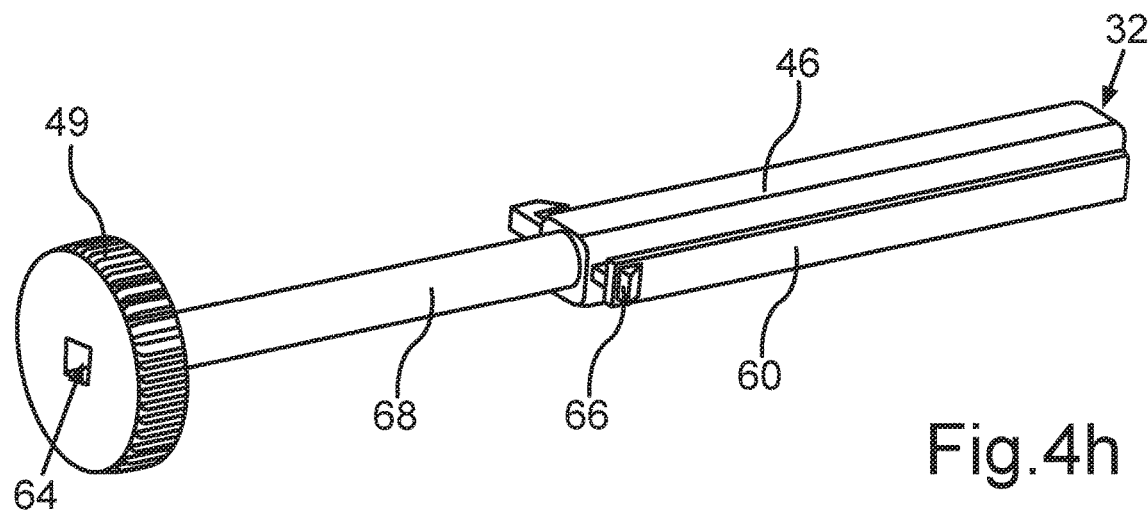
FIG. 4h a portion of a schematic perspective view of the tool per FIG. 4f.

Moreover, it is especially well shown in FIG. 4*h* that the guide element 60 is formed as a T-rail for guiding on the actuator 18. An angle piece is provided here as an end stop 66. Hence, the tool 32 can be moved in translation along the passage direction and along the guide element 62 relative to the center console 10 until the end stop 66 abuts against the guide element 62 along the passage direction. The tool 32 is then in an advantageous position in which the movement element 48 can be moved in translation in the described manner relative to the housing 46, so as to actuate the actuating element 20 and then deactivate the parking lock.

Figure 4I:
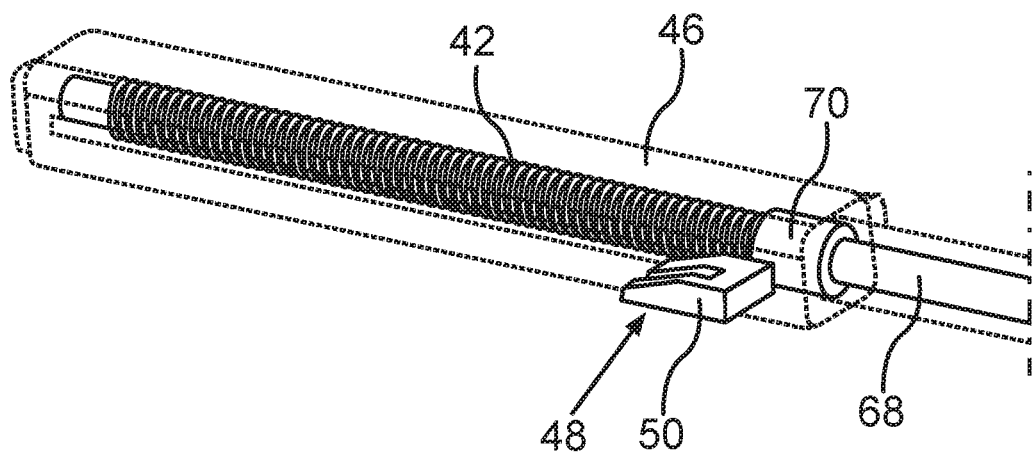
FIG. 4i a portion of a schematic perspective view of the tool per FIG. 4f-h.

It is shown in FIG. 4*i* that the operating element 49 is rotationally fixed to an activating rod 68, which in turn is rotationally fixed to the threaded spindle 42. In particular, for example, the activating rod 68 is formed as a single piece with the threaded spindle 42. FIG. 4*i* shows the housing 46 in see-through manner, so that the nut denoted as 70 in FIG. 4*i* is especially well shown in FIG. 4*i*, being screwed onto the threaded spindle 42. Moreover, it is especially well shown in FIG. 4*i* that the nut 70 is joined to the carriage 50, fashioned as a catching hook.

It is especially well shown in FIG. 4*g* that the movement element 48 for example passes through a slot 72 of the housing 46 and can be moved in translation along the slot 72 toward the housing 46.

Figure 4J:
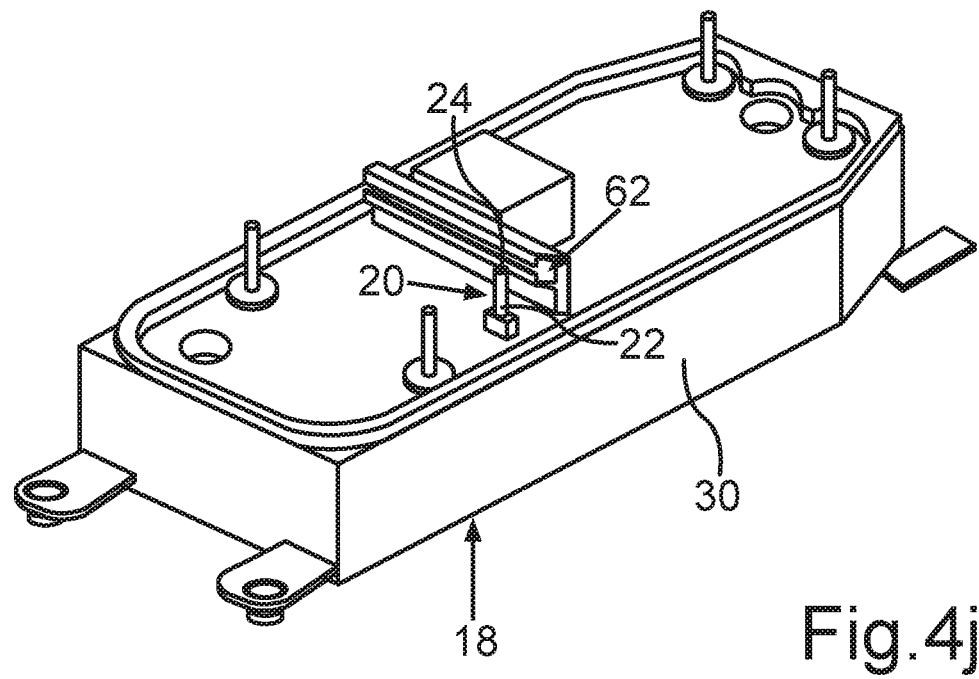
FIG. 4j a schematic perspective view of the actuator for the first embodiment of the actuating mechanism.
Figure 4K:
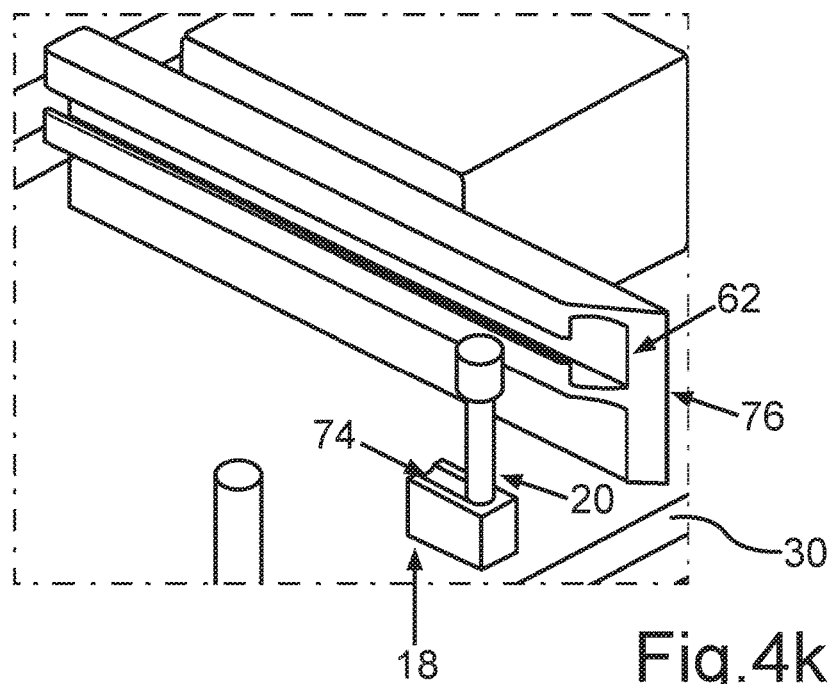
FIG. 4k a portion of a schematic perspective view of the actuator per FIG. 4j.

FIG. 4*j* shows the actuator 18 which is used for the first embodiment. The actuating element 20 and the guide element 62 are especially well shown in FIGS. 4*j* and 4*k*. The guide element 62 is fashioned as a T-piece corresponding to the T-rail for guidance of the tool 32. A guide piece 74 is also provided, by means of which the actuating element 20 is guided during its movement to the unlocking position. At a front end face 76, the guide element 62 has a bevel, or the guide element 62 is slanted in shape, in order to thread the T-rail especially easily into the guide element 62.

Figure 4L:
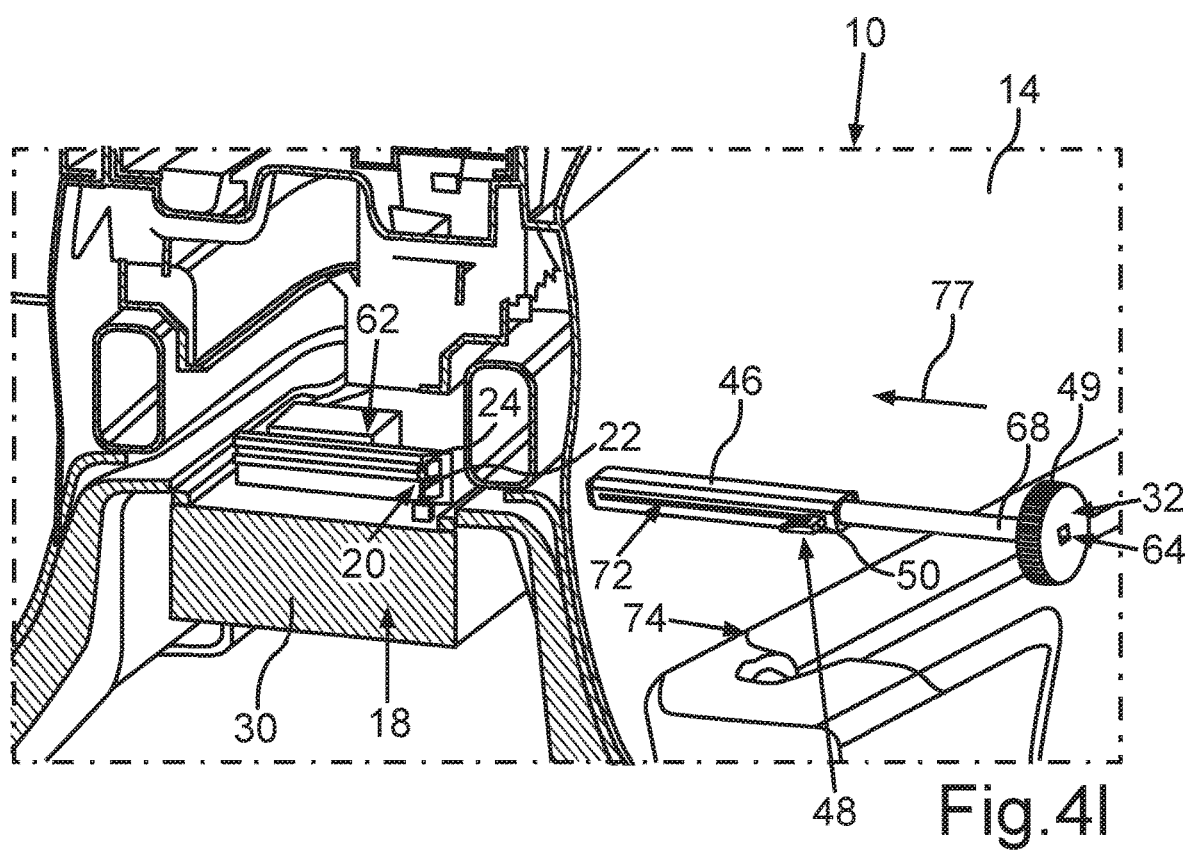
FIG. 4l a portion of a schematic and perspective sectioned view of the actuating mechanism according to the first embodiment.
Figure 4M:
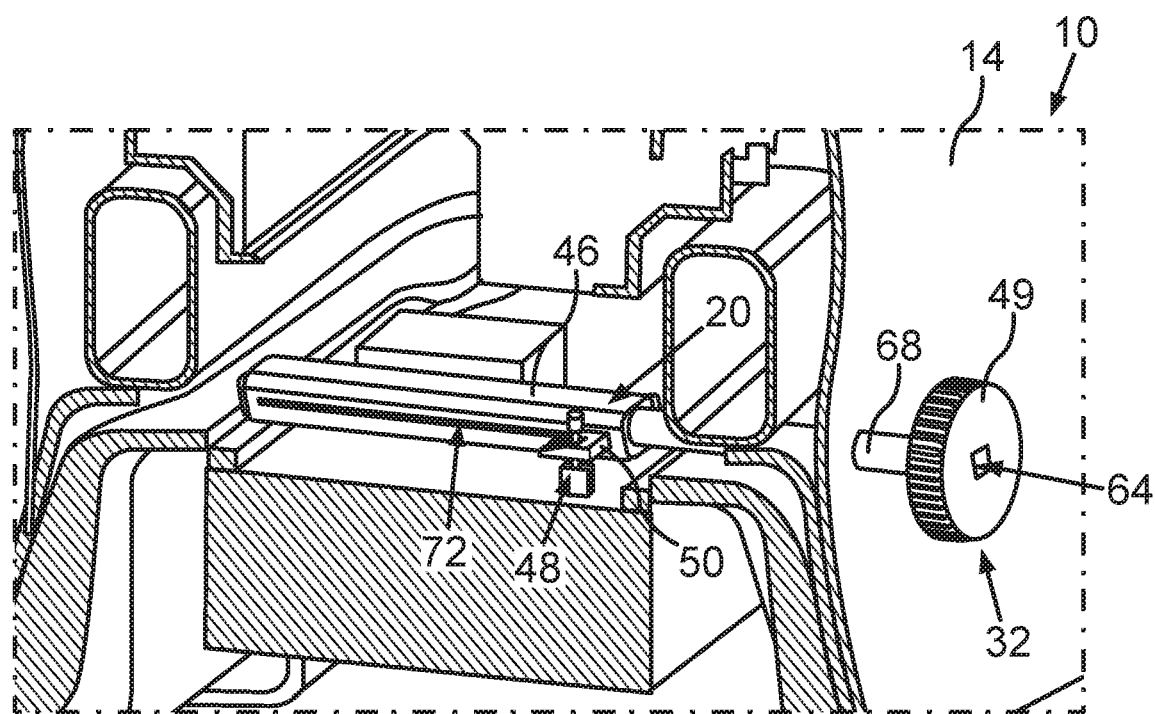
FIG. 4m a portion of a schematic and perspective sectioned view of the actuating mechanism according to the first embodiment.
Figure 4N:
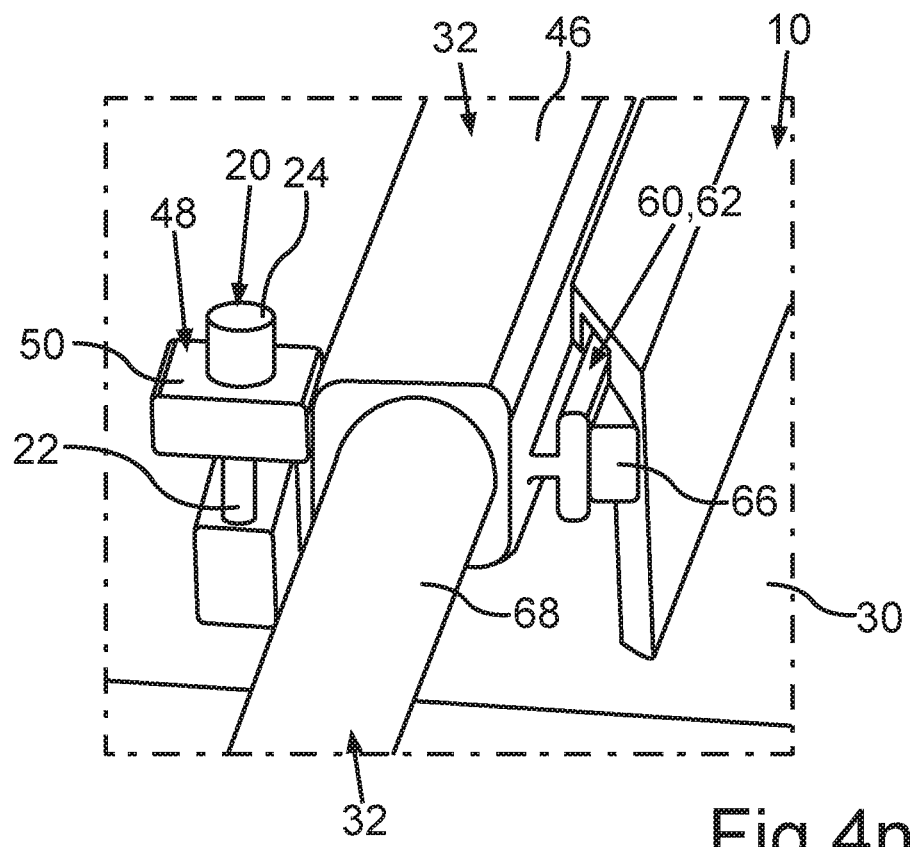
FIG. 4n a portion of a schematic and sectioned perspective view of the actuating mechanism according to the first embodiment.
Figure 4O:
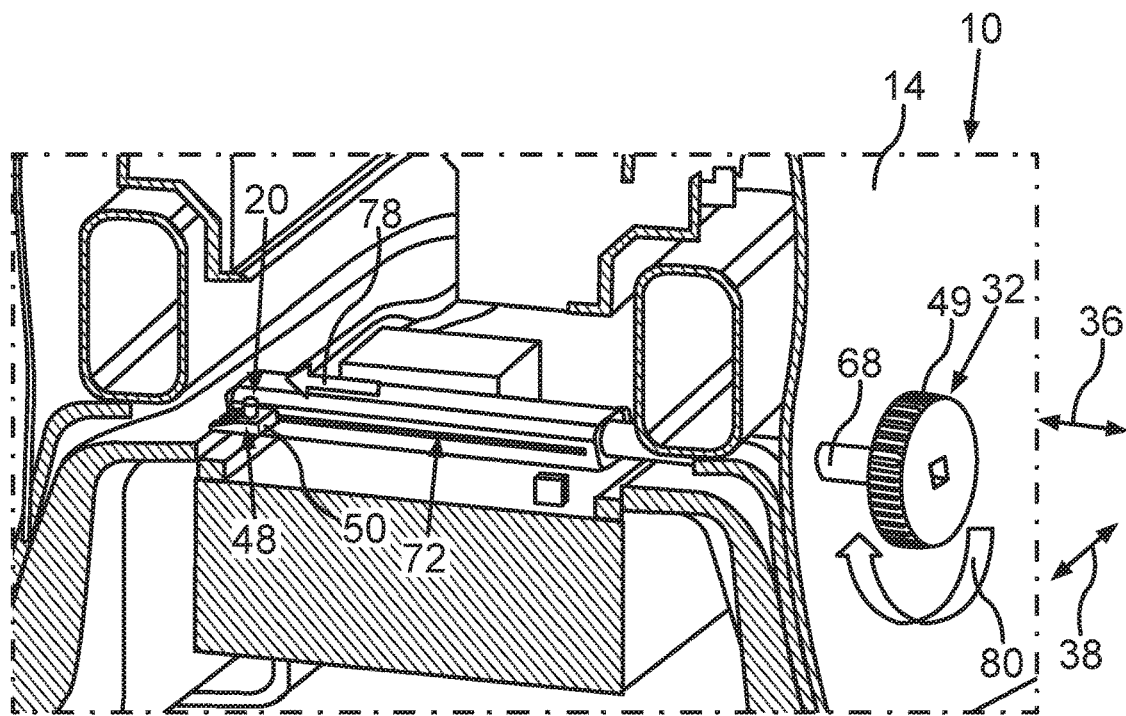
FIG. 4o a portion of a schematic and sectioned perspective view of the actuating mechanism according to the first embodiment.

As illustrated in FIG. 4*l* by an arrow 77, at first the tool 32 is pushed through the through opening 34 and thus through the side wall 14. In this process—as is shown especially well in FIGS. 4*m* and 4*n*—the guide element 60 is brought into form fitted interaction with the guide element 62, by which the tool 32 is guided in defined manner relative to the center console 10. The tool 32 is pushed through the through opening 34 until the end stop 66 comes to bear against the guide element 62 along the passage direction. The actuating element 20 then finds itself in the catching hook, especially in the recess 58 of the movement element 48. If the threaded spindle 42 is then turned in the first direction of rotation relative to the housing 46, the actuating element 20 will be moved into the unlocking position—as can be seen in FIG. 4*o*—thereby deactivating the parking lock. This is illustrated in FIG. 4*o* by an arrow 78, while an arrow 80 illustrates the turning of the threaded spindle 42 and thus the rotary knob in the first direction of rotation.

FIG. 5*a-d* illustrate a second embodiment of the actuating mechanism 16. In the second embodiment, the tool 32 is formed as a push rod, especially in a single piece, which can be pushed along the passage direction through the through opening 34. The push rod has a form fit mechanism 82, which can be brought into form-fitted interaction with the actuating element 20 for actuating the actuating element 20. In the second embodiment, the form fit mechanism 82 has an external toothing 84, comprising a plurality of teeth 86 arranged in succession along the passage direction.

In the second embodiment, the actuating element 20 is a gear 88, for example, with another external toothing, which can interact with the external toothing 84. The gear 88 for example is part of an unlocking attachment 90 and it may be part of a gearing, also known as an unlocking gear. It can be seen from FIG. 5a that the actuator 18 comprises, for example, the aforementioned electric motor, denoted as 92 in FIG. 5a, and a gearing 94, which can be actuated by the gear 88. The gear 88 can turn about an axis of rotation 96 relative to the housing 30 of the actuator 18. Now, if the push rod is displaced along the passage direction relative to the housing 30 and relative to the center console 10, so that the external toothing 84 interacts with the external toothing of the gear 88, this will turn the gear 88 about the axis of rotation 96 relative to the housing 30. The gearing 94 and the electric motor 92 of the actuator 18 will then be turned, thereby deactivating the parking lock by the actuator 18, especially the gearing 94, by means of the push rod. In other words, by pushing the push rod, formed as a rack, along the passage direction relative to the center console 10 the electric motor 92 will be moved, in particular turned, so that the gearing 94 of the actuator 18 will be activated. In this way, the parking lock is deactivated. In this process, the push rod is pushed in a first direction, coinciding with the passage direction and illustrated by an arrow 98 in FIG. 5a, thereby deactivating the parking lock. If the push rod is moved in translation in a second direction, opposite the first direction and illustrated by an arrow 100 in FIG. 5a, especially relative to the housing 30 and/or relative to the center console 10, the parking lock will be activated once more.

The gear 88 is utilized for example as the unlocking gear or as part of the unlocking gear, and by means of the unlocking gear the parking lock can be manually and mechanically unlocked by means of the tool 32. It is conceivable, for example, for the gear 88 to be pressed against the electric motor 92 or against a corresponding gear 102 of the unlocking gear by means of the tool 32, so that the unlocking gear is not always actively driven whenever the parking lock is deactivated by means of the electric motor 92. In this way, the tool 32 could be permanently installed or held at least indirectly, especially directly, on the center console 10.

Figure 5A:
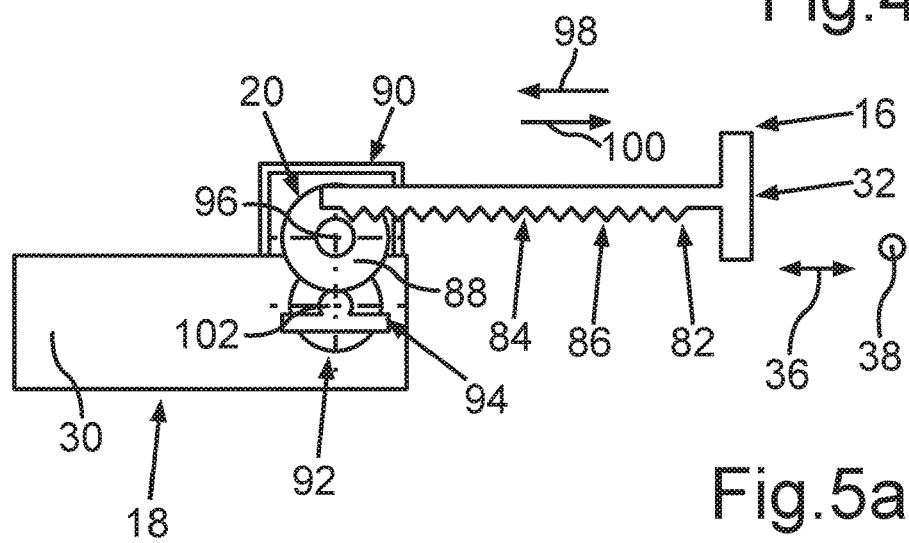
FIG. 5a a portion of a schematic and sectioned view of the actuating mechanism according to a second embodiment.
Figure 5B:
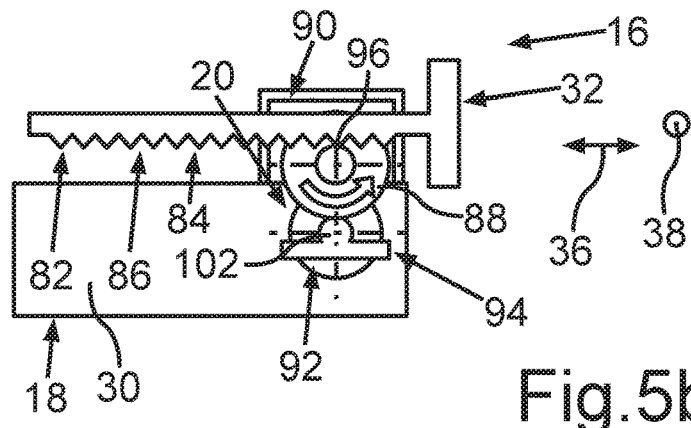
FIG. 5b a portion of a schematic and sectioned view of the actuating mechanism according to a second embodiment.
Figure 5C:
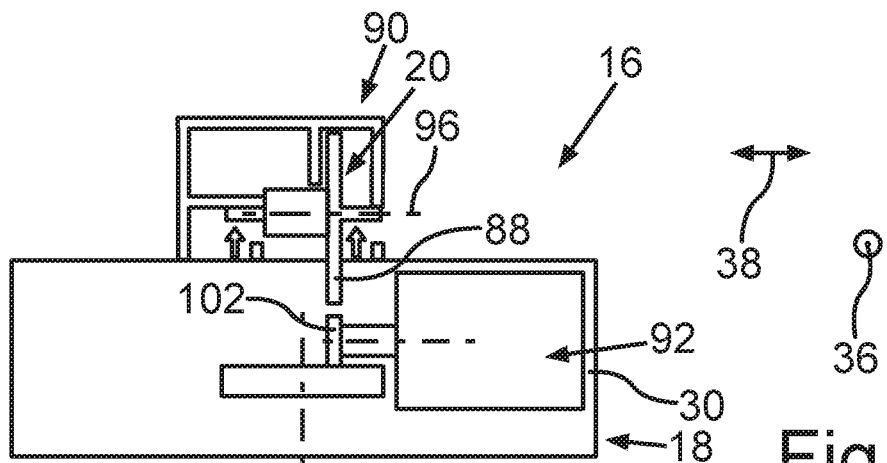
FIG. 5c a portion of a schematic and sectioned view of the actuating mechanism according to the second embodiment.
Figure 5D:
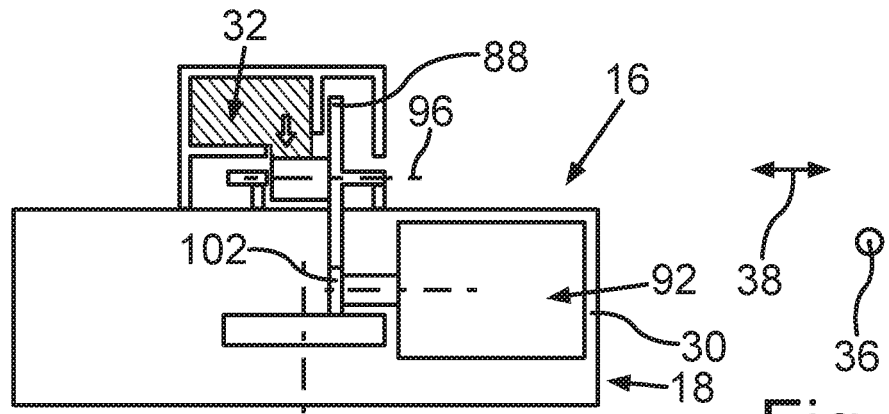
FIG. 5d a portion of a schematic and sectioned view of the actuating mechanism according to the second embodiment.

It is illustrated in FIG. 5b that the gears 88 and 102 are turned accordingly when the push rod is pushed in the first direction. FIG. 5c shows the actuating mechanism 16 of the second embodiment in a position of rest, in which for example the push rod does not interact with the gear 88. In the position of rest, the gear 88 is decoupled from the gear 102 and thus from the electric motor 92, so that if the parking lock is deactivated by means of the electric motor 92 the gear 88 is not turned by means of the electric motor 92. But if—as illustrated in FIG. 5d—the push rod (tool 32) is now brought into interaction with the gear 88 (actuating element 20), then the gear 88 will be coupled to the gear 102. As a result, the electric motor 92 will be activated, in particular turned, by the push rod via the gear 102 and the gear 88, so that the parking lock will be deactivated, for example.

Figure 6:
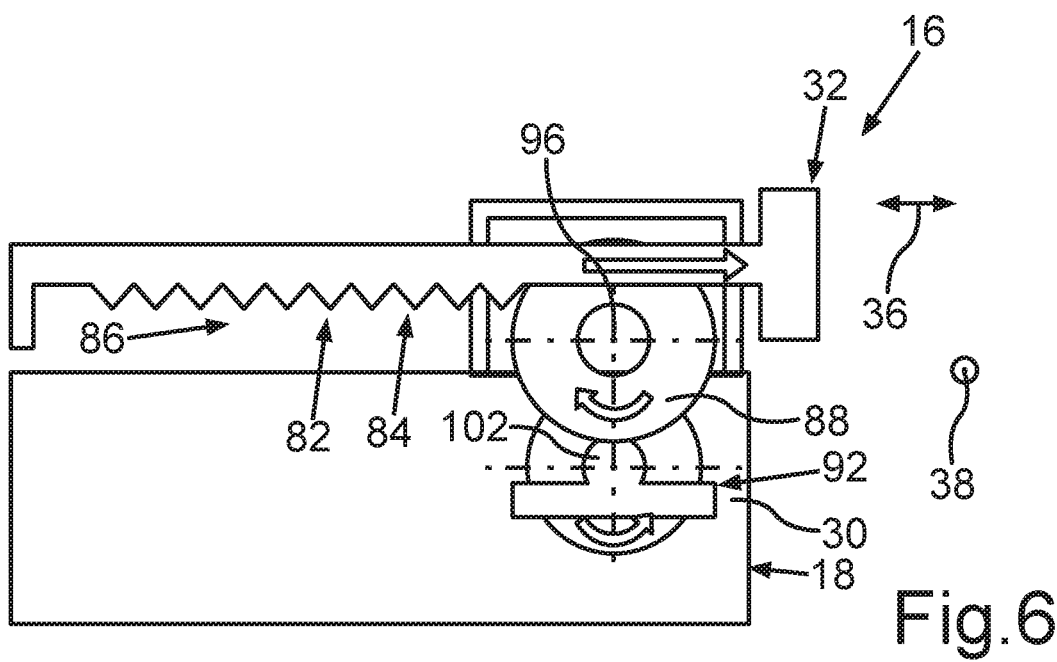
FIG. 6 a portion of a schematic side view of the actuating mechanism according to a third embodiment.

FIG. 6 shows a third embodiment, in which the push rod is pulled out from the center console 10 in order to deactivate the parking lock. By contrast, in the second embodiment it is provided that the push rod is pushed into the center console 10 in order to deactivate the parking lock. Thus, in the third embodiment, a functional principle is provided which is the opposite of the functional principle of the second embodiment, especially in regard to the direction in which the tool 32 is moved in translation for deactivating the parking lock. In particular, the tool 32 makes possible a current-free activating and especially deactivating of the parking lock.

The unlocking gear is utilized to realize the revolutions, especially of the electric motor 92 or its rotor, which are needed for the deactivating of the parking lock. Thanks to the unlocking gear, the existing electric motor 92 is moved by mechanical work, which is performed for example through the tool 32 and transmitted to the unlocking gear.

The second and third embodiment are to be viewed as aspects or objects which are separate and independent from the other embodiments and exemplary embodiments and may thus constitute their own separate and independent inventions.

FIG. 7a-e illustrate a fourth embodiment of the actuating mechanism 16. In the fourth embodiment, the tool 32 is likewise fashioned as a push rod, while the form fit mechanism 82 has a recess 106 situated at the front end face 104 of the push rod for catching and holding the actuating element 20. If the push rod is pushed along the passage direction through the through opening 34 and inserted into the center console 10, the actuating element 20 will be grasped by the recess 106 of the push rod and pulled backward or moved into the unlocking position by the thrusting movement of the push rod.

In this case, at least one first locking element 108 is held on the push rod. A second locking element 110, corresponding to the locking element 108, is provided on the actuator 18, especially its housing 30, and/or on the center console 10, with which the locking element 108 can be locked.

Figure 7A:
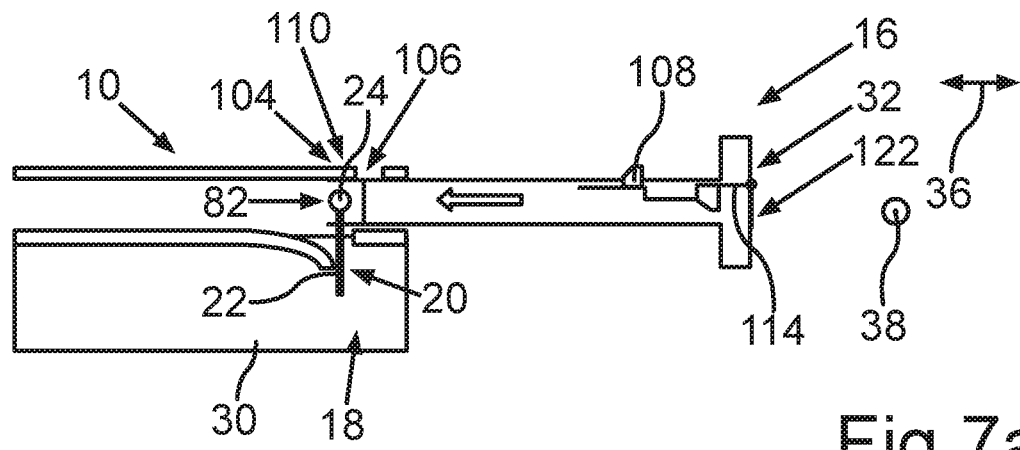
FIG. 7a a portion of a schematic and sectioned side view of the actuating mechanism according to a fourth embodiment.
Figure 7B:
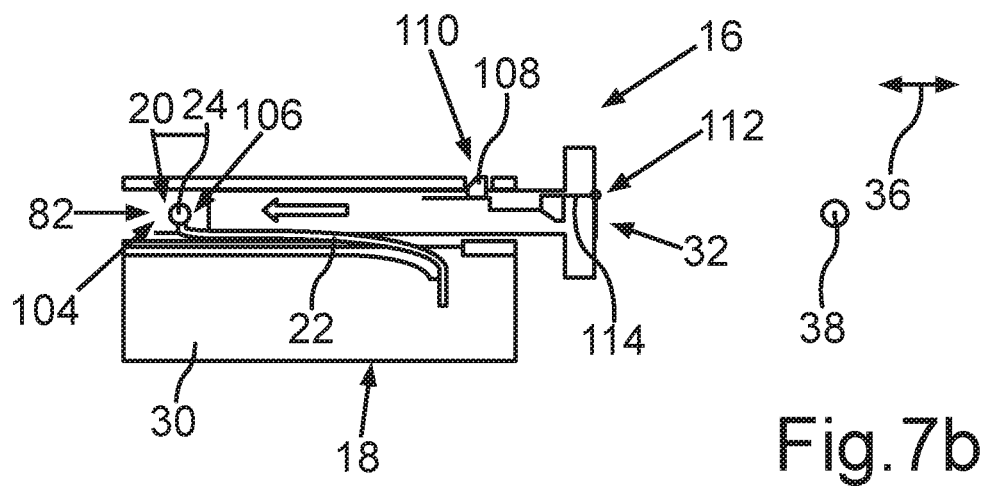
FIG. 7b a portion of a schematic and sectioned side view of the actuating mechanism according to a fourth embodiment.
Figure 7C:
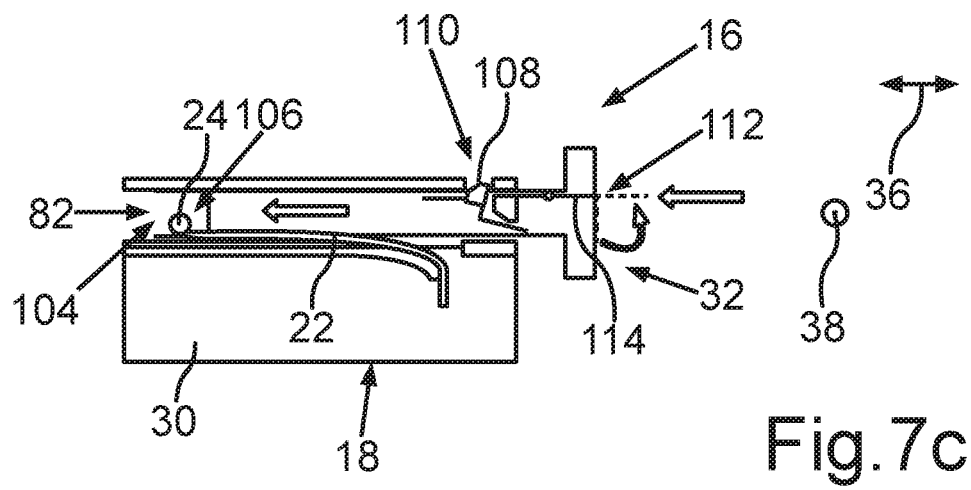
FIG. 7c a portion of a schematic and sectioned side view of the actuating mechanism according to a fourth embodiment.

It can be seen in FIG. 7b that the locking element 108 engages with the locking element 110, the locking elements 108 and 110 interacting by form fit. In this way, the actuating element 20 can be held in the unlocking position.

In order to release the locking elements 108 and 110 from each other, a lever actuation 112 is provided. The lever actuation 112 comprises at least one lever 114 held in pivoting manner on the push rod, by means of which the locking elements 108 and 110 can be released from each other, for example. For this, the locking element 108 for example is moved by means of the lever 114 out from the locking element 110, which is formed as a recess for example. The push rod can then be pulled out from the center console 10. In this way, the actuating element 20 can be moved out of the unlocking position, so that the parking lock is activated once again. The locking elements 108 and 110 are thus released from each other in particular by means of the lever actuation 112, the lever actuation 112 being unfolded and pushed onto the locking element 108. In this way, for example, the lever 114 pushes the locking element 108 downward and out from the locking element 110.

Figures 7D, 7E:
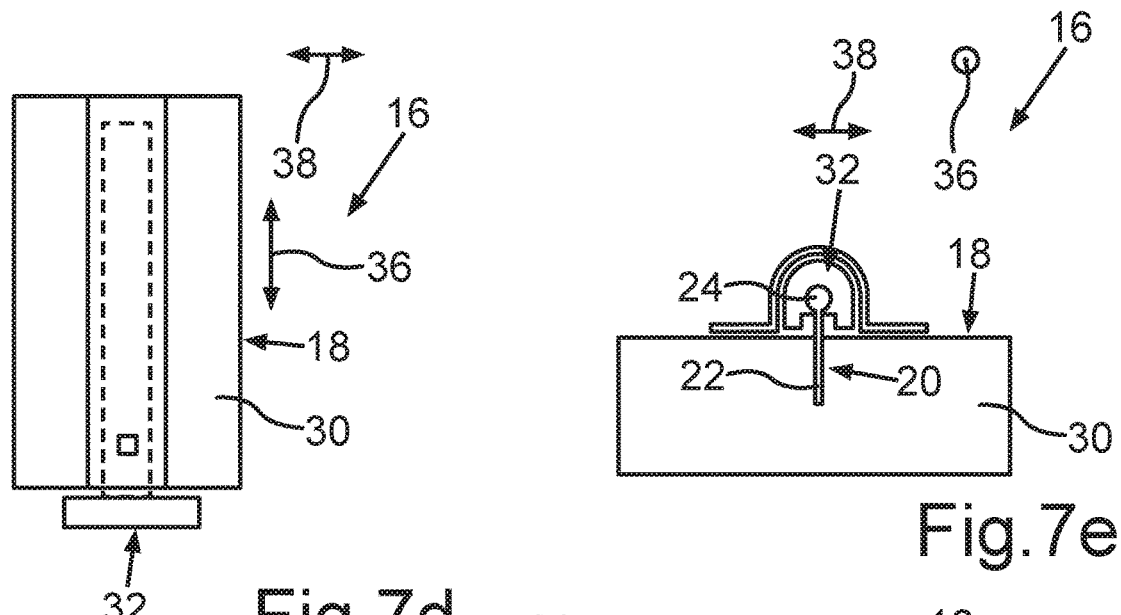
FIG. 7d a portion of a schematic top view of the actuating mechanism according to a fourth embodiment.
FIG. 7e a portion of a schematic rear view of the actuating mechanism according to the fourth embodiment.

FIG. 7d shows the push rod according to the fourth embodiment in a state in which the parking lock is deactivated. FIG. 7e shows the actuating mechanism 16 according to the fourth embodiment in a rear view.

Figure 8A:
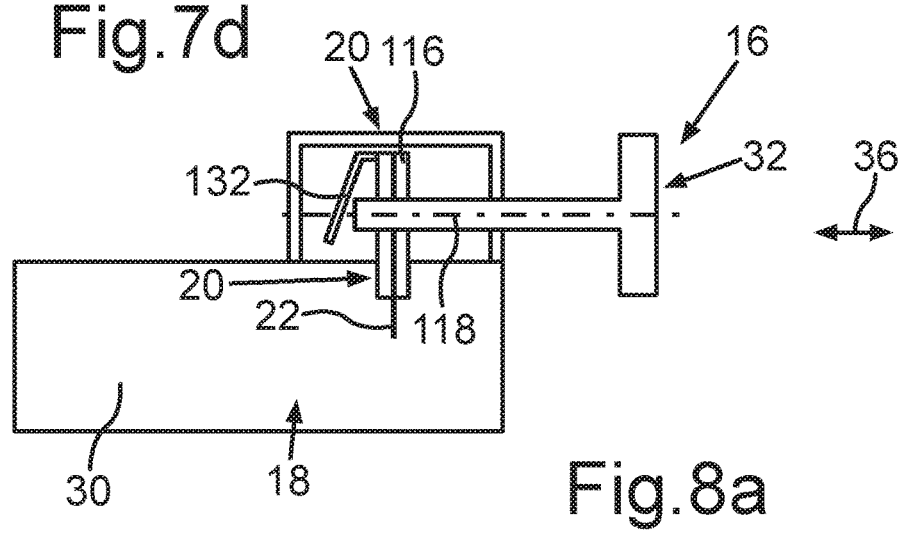
FIG. 8a a portion of a schematic and sectioned side view of the actuating mechanism according to a fifth embodiment.
Figure 8B:
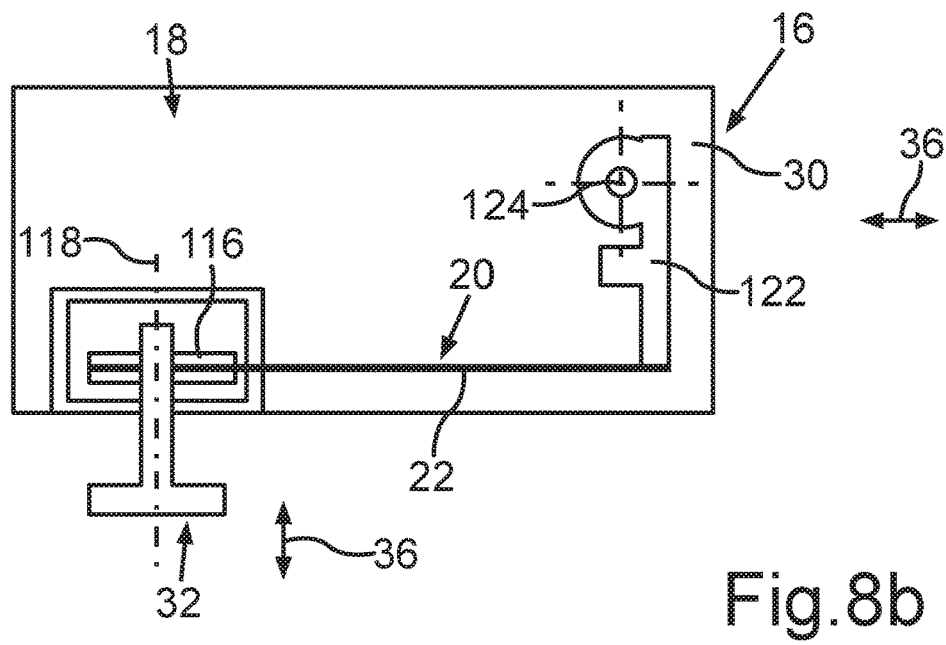
FIG. 8b a portion of a schematic top view of the actuating mechanism according to the fifth embodiment.
Figure 8C:
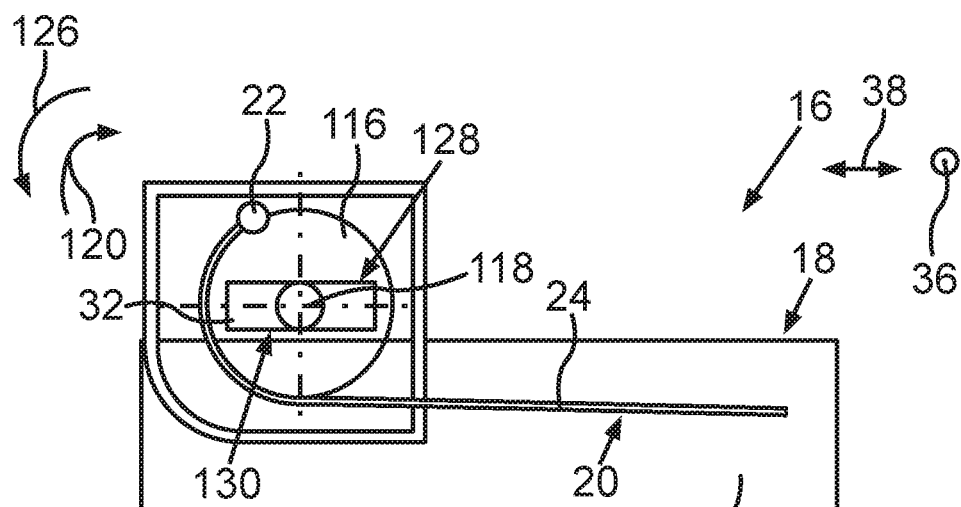
FIG. 8c a portion of a schematic and sectioned side view of the actuating mechanism according to the fifth embodiment.

FIG. 8a-c show a fifth embodiment of the actuating mechanism 16. In the fifth embodiment, a roll 116 is provided, which is held rotatably for example on the actuator 18, especially the housing 30. The roll 116 can be turned about an axis of rotation 118 relative to the housing 30. The tool 32 is fashioned for example as a push rod or a wrench, the tool 32 and the roll 116 being components formed separate from each other, for example. In particular, the roll 116 may be part of the actuating element 20. As can be seen from FIG. 8c, the cable 22 is connected via the fitting 24 to the roll 116 in form fitting manner, for example. If the roll 116 is turned about the axis of rotation 118 in a first direction of rotation, illustrated by an arrow 120 in FIG. 8c, this will pull on the cable 22. In this way, a lever 122 will swivel, as can be seen for example in FIG. 8b. The lever 122 for example is held in pivoting manner on the housing 30 and can thus be pivoted about a swivel axis 124 relative to the housing 30.

By turning the roll 116, the parking lock can be deactivated. If the roll 116 is then turned for example in a second direction of rotation, opposite the first direction of rotation and illustrated in FIG. 8c by an arrow 126, the parking lock will be activated once more in this way.

In order to turn the roll 116 by means of the tool 32 about the axis of rotation 118, the tool 32 for example is inserted into a corresponding recess 128 of the roll 116. The recess 128 is nonround at its inner circumference, and a region 130 of the tool 32 is also nonround at its outer circumference. The region 130 is inserted into the recess 128, so that the tool 32 can interact through the region 130 in the recess 128 by form fit with the roll 116. In this way, torques can be transmitted from the tool 32 to the roll 116, by which the roll 116 can be turned in the first direction of rotation relative to the housing 30. The inserting of the tool 32 into the roll 116 or into the recess 128 is especially well shown in FIG. 8b.

Furthermore, a ratchet 132 is provided, as can be seen in FIG. 8a, by means of which the roll 116 can be prevented from turning about the axis of rotation 118 relative to the housing 30. For example, if the push rod (the tool 32) fashioned as a wrench is introduced into the roll 116, especially the recess 128, this will activate the ratchet 132, so that the ratchet 132 will prevent the roll 116 from turning in the second direction of rotation, especially by form fitting. In this way, the roll 116 cannot turn in the second direction of rotation while the tool 32 is inserted into the roll 116. If the tool 32 is pulled out from the roll 116, the ratchet 132 will be released or deactivated, so that the roll 116 can then turn in the second direction of rotation. In this way, the parking lock can be activated once more. It is evident from FIG. 8a-c that the axis of rotation 118 runs in the plane subtended by the vehicle longitudinal direction and the vehicle transverse direction and thus in the vehicle transverse direction, so that for example the axis of rotation 118 coincides with the passage direction. The roll 116 is thus configured as an upright roll.

FIG. 9a-d show a sixth embodiment, which differs in particular from the fifth embodiment in that the roll 116 is configured as a horizontal roll. The axis of rotation 118 here runs perpendicular to the mentioned plane and thus in the vehicle height direction in particular. Moreover, as is especially well shown in FIG. 9a, b, the roll 116 fashioned as a disk for example can be locked by means of the ratchet 132, especially in its end position. If the tool 32 is pulled out from the through opening 34 or from the center console 10, the roll 116 will be released, whereupon the parking lock can be activated once more.

Figure 9A:
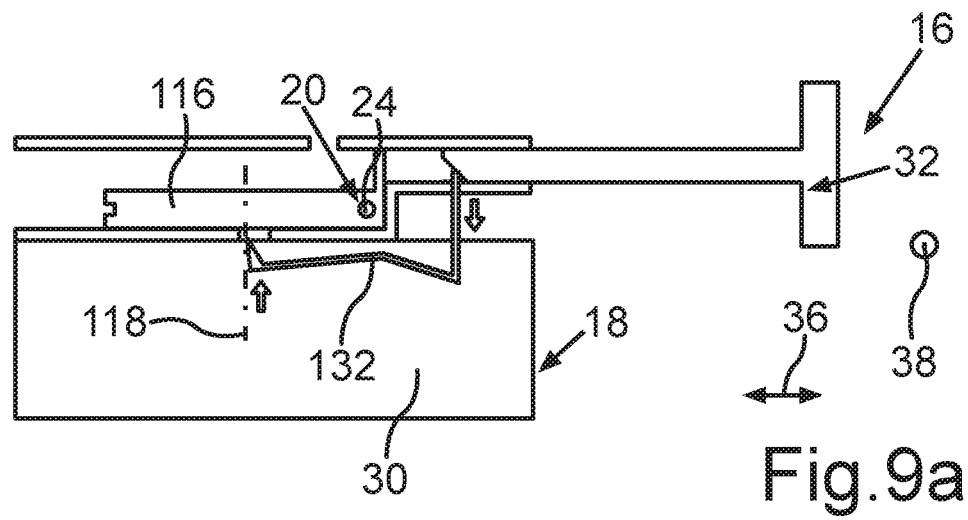
FIG. 9a a portion of a schematic and sectioned side view of the actuating mechanism according to a sixth embodiment.
Figure 9B:
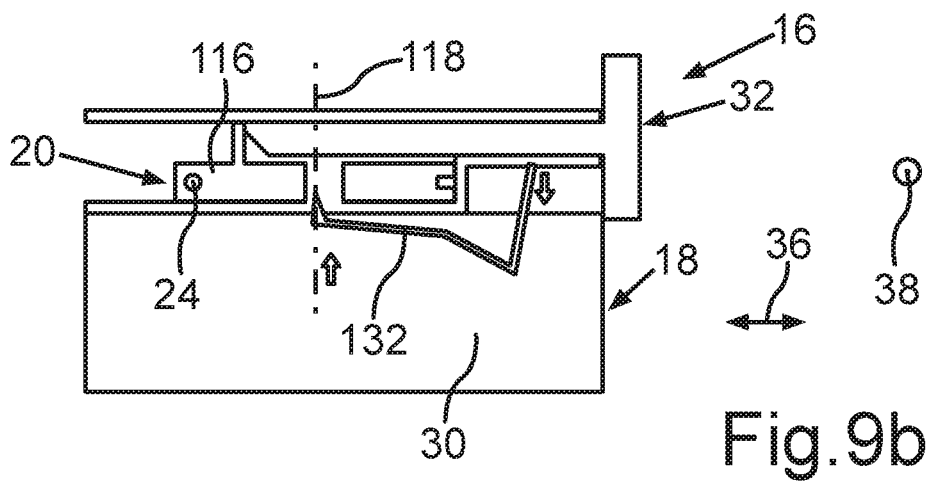
FIG. 9b a portion of a schematic and sectioned side view of the actuating mechanism according to a sixth embodiment.
Figure 9C:
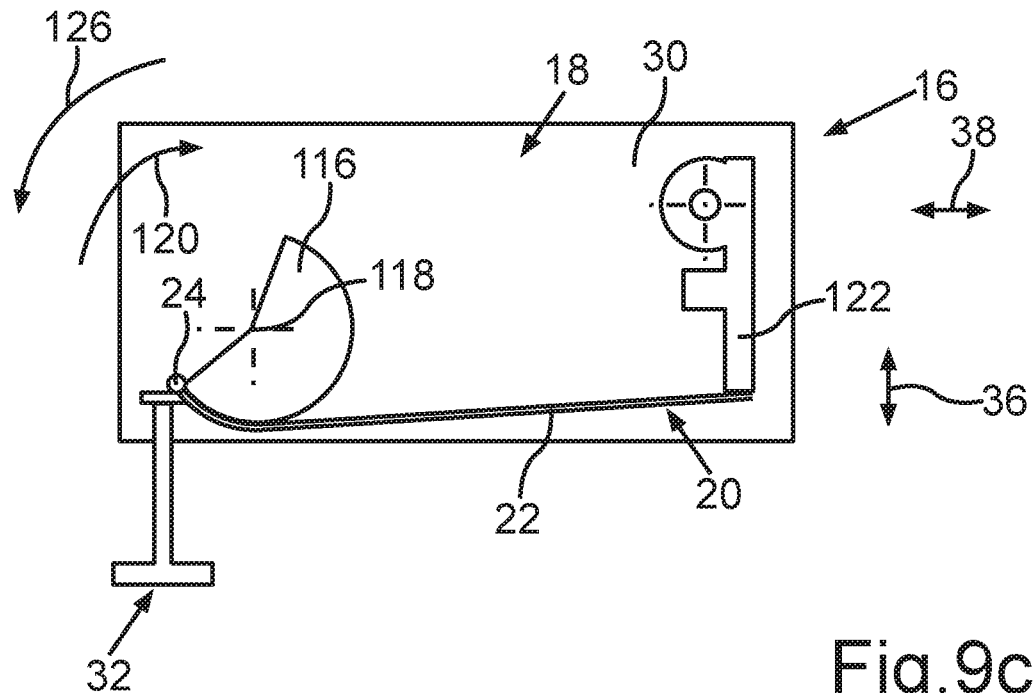
FIG. 9c a portion of a schematic top view of the actuating mechanism according to the sixth embodiment.
Figure 9D:
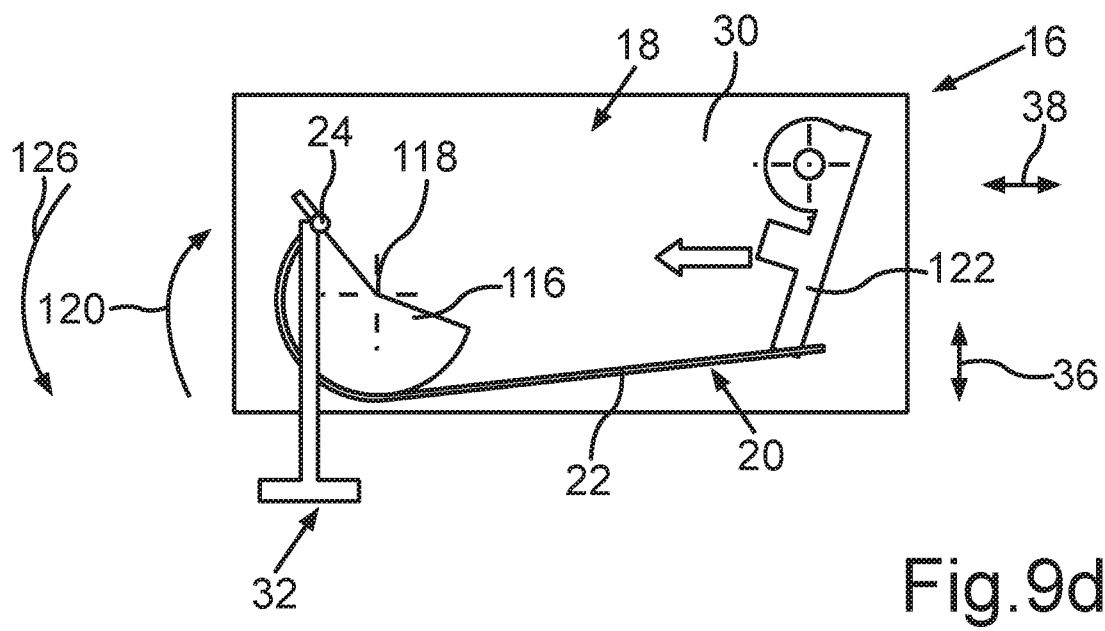
FIG. 9d a portion of a schematic top view of the actuating mechanism according to the sixth embodiment.

As can be seen from FIG. 9c, d, in the sixth embodiment the roll 116 can be turned about the axis of rotation 118 for example by displacing the tool 32 along the passage direction relative to the center console 10. This displacement of the tool 32 is transformed into a rotation of the roll 116. By contrast, in the fifth embodiment it is provided that the tool 32 is turned about the axis of rotation 118 relative to the center console 10 in order to turn the roll 116 relative to the center console 10 and thus deactivate the parking lock.

In other words, in the sixth embodiment it is provided that the tool 32, fashioned for example a tool kit, presses against the horizontal roll 116 in order to move the actuating element 20 to the unlocking position in this way. Upon inserting the tool 32, the ratchet 132 is activated, which prevents the turning of the roll 116 in the second direction of rotation. When the tool 32 is pulled out, the ratchet 132 is released, so that the roll 116 can turn back in the second direction of rotation.

Figure 10A:
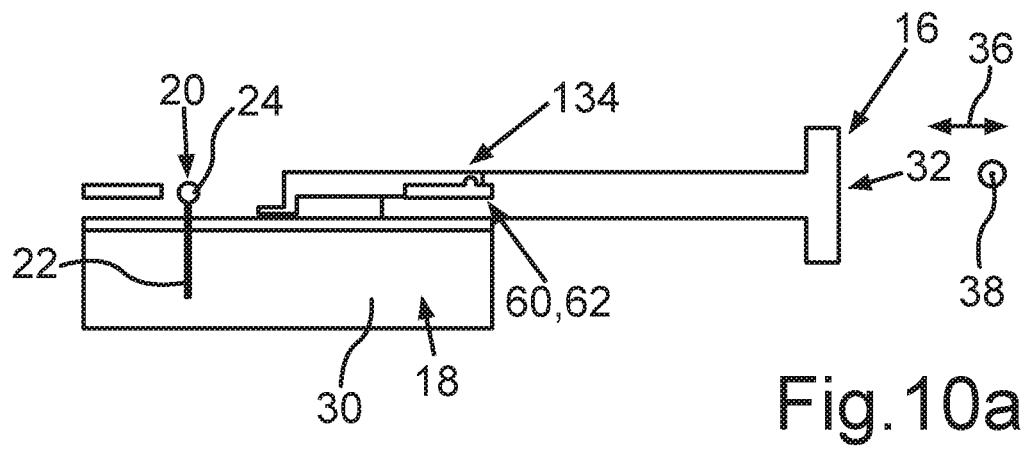
FIG. 10a a portion of a schematic and sectioned side view of the actuating mechanism according to a seventh embodiment.
Figure 10B:
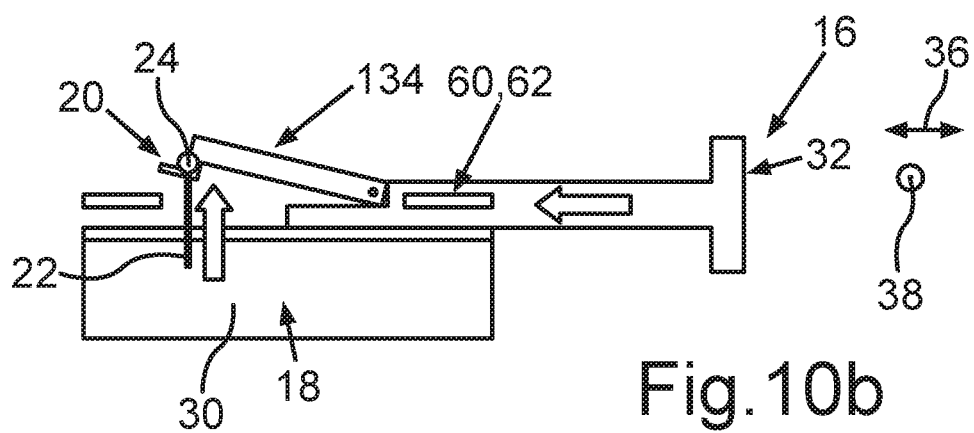
FIG. 10b a portion of a schematic and sectioned side view of the actuating mechanism according to a seventh embodiment.
Figure 10C:
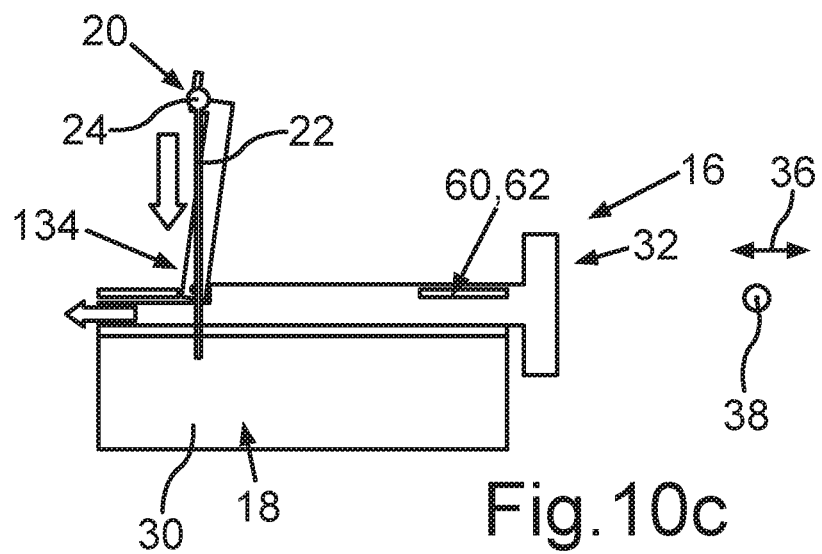
FIG. 10c a portion of a schematic and sectioned side view of the actuating mechanism according to a seventh embodiment.
Figure 10D:
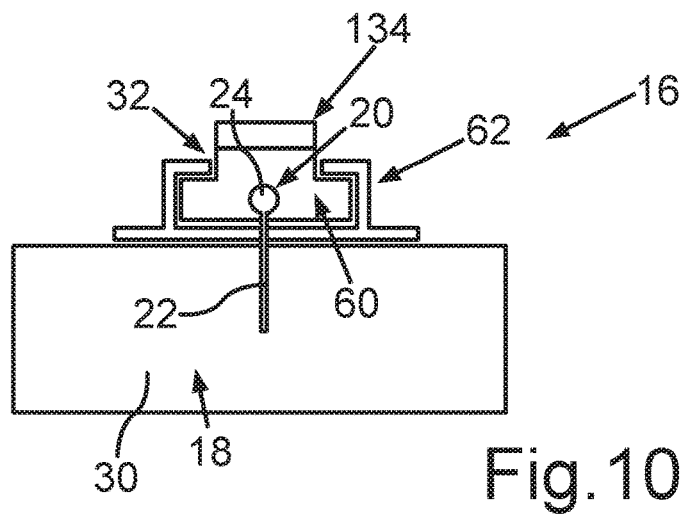
FIG. 10d a portion of a schematic and sectioned rear view of the actuating mechanism according to the seventh embodiment.
Figure 10E:
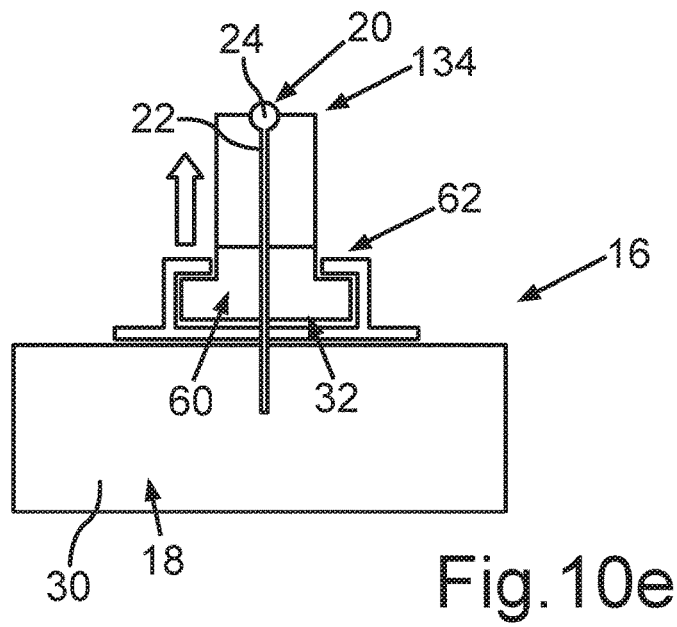
FIG. 10e a portion of a schematic and sectioned rear view of the actuating mechanism according to the seventh embodiment.

FIG. 10a-c show a seventh embodiment of the actuating mechanism 16. In the seventh embodiment, the tool is again fashioned as a push rod, for example, on which a toggle lever 134 is provided. In other words, in the seventh embodiment the tool 32 comprises at least one toggle lever 134 for actuating the actuating element 20, for example. The actuating of the actuating element 20 by means of the toggle lever 134 is shown especially well in FIG. 10b-e. The actuating element 20 is grasped by the toggle lever 134 and pulled upward by the thrusting movement of the tool 32. In an end position, for example, the toggle lever 134 has a dead center position, so that the actuating element 20 is held automatically in the unlocking position. This dead center position is shown especially well in FIG. 10c. The parking lock can thus be activated once more simply by pulling the tool 32 actively out from the center console 10. An activating of the parking lock by the actuating element 20 or by the parking lock itself can be avoided.

Figure 11A:
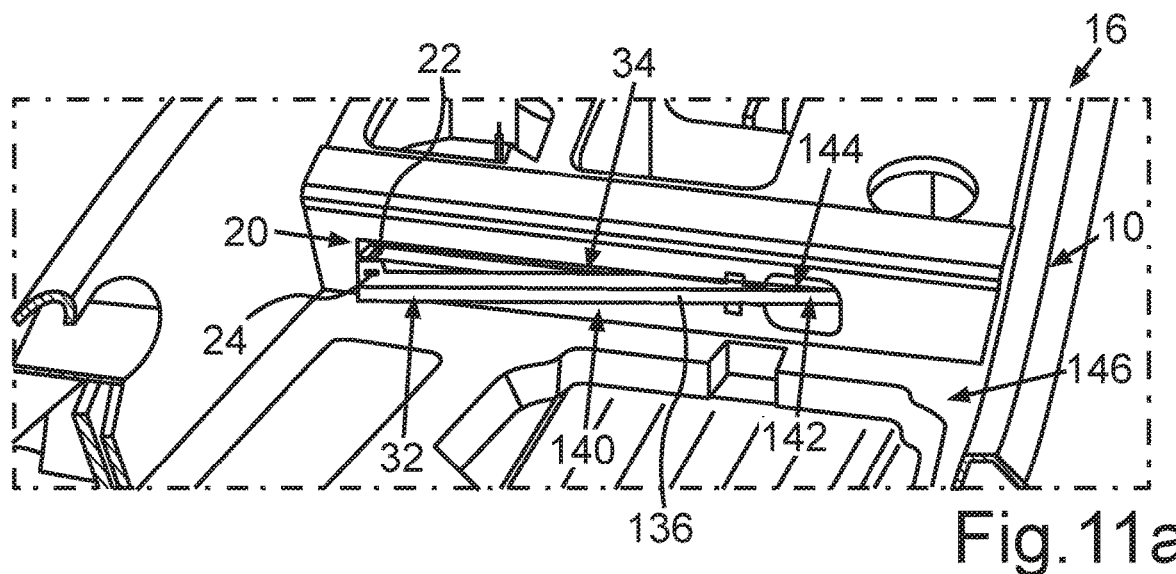
FIG. 11a a portion of a schematic perspective view of the actuating mechanism according to an eighth embodiment.

FIG. 11a, b show an eighth embodiment of the actuating mechanism 16. In the eighth embodiment, the tool 32 is fashioned as a tool fixed to the vehicle, which is held at least indirectly, especially directly, on the center console 10. The tool 32 here comprises a lever 136, which is held on the center console 10 and can pivot about a swivel axis relative to the center console 10. The swivel axis runs perpendicular to the planes subtended by the vehicle transverse direction and the vehicle longitudinal direction and thus in the vehicle height direction. The through opening 34 extends in a plane which is subtended by the vehicle transverse direction and the vehicle height direction. It is evident from FIG. 11a, b that the lever 136 can be moved, especially pivoted, for example from a starting position to at least one activating position B, shown in FIG. 11b, relative to the center console 10. In the activating position B, the actuating element 20 connected to the lever 136 for example is activated, thereby unlocking the parking lock. In this process, the lever 136 for example passes through the through opening 34 at least in the activating position B.

Figure 11B:
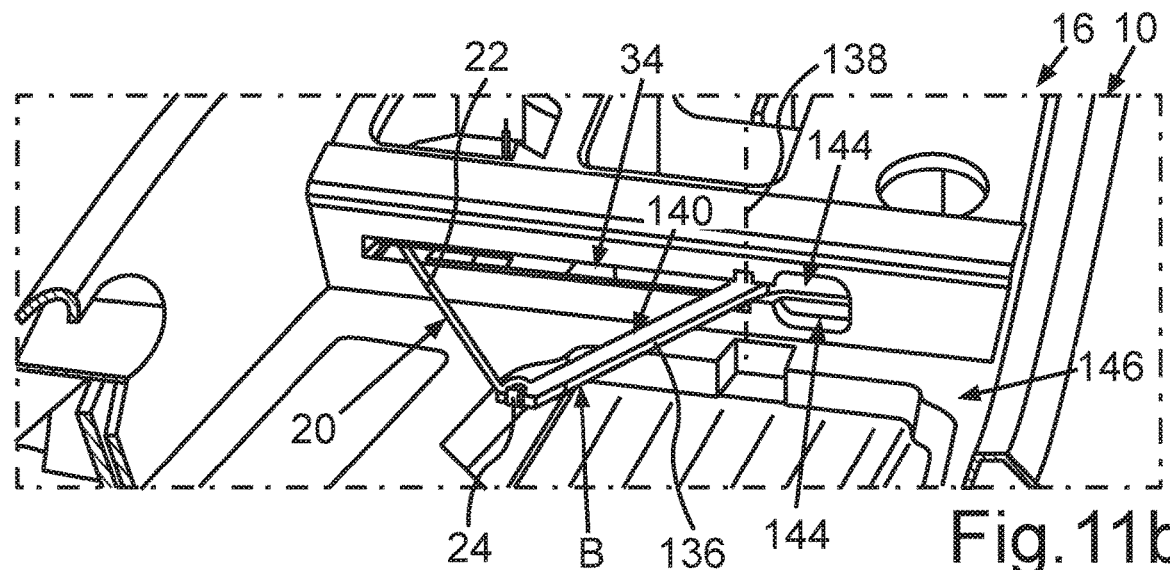
FIG. 11b a portion of a schematic perspective view of the actuating mechanism according to an eighth embodiment.

The mentioned swivel axis is shown in FIG. 11b and is denoted there as 138. It is especially well shown in FIG. 11b that the lever 136 comprises a first length portion 140 and a second length portion 142. The swivel axis 138 is situated between the length portions 140 and 142. The length portion 142 is associated with a recess 144, formed for example as a concavity. For example, if a force, especially a compressive force, acting in the direction of the center console 10 is exerted on the length portion 142, the lever 136 will pivot a bit from its starting position to a gripping position, shown in FIG. 11a, about the swivel axis 138 relative to the center console 10. The compressive force is exerted on the length portion 142 for example by a person pressing with their thumb in the recess 144 and thus against the length portion 142. In the gripping position, the person can grasp or reach around the length portion 140 with their hand and swivel the lever 136 into the activating position, thereby pulling on the actuating element 20 and deactivating the parking lock. In other words, the lever 136 is released by thumb pressure in the concavity, so that for example the person's index and middle fingers can end up behind the length portion 140. With the index and middle fingers, a turning movement of the lever 136 to the activating position B can be accomplished, so that the actuating element 20 is pulled by 100 millimeters, for example. This deactivates the parking lock. In this way, the parking lock can be deactivated without having to remove the center console 10. Moreover, in the eighth embodiment the cable 22 or the actuating element 20 are guided into the interior 12. The through opening 34 here is an access point which in the eighth embodiment is integrated in a front storage tray 146 of the center console 10.

Figure 12A:
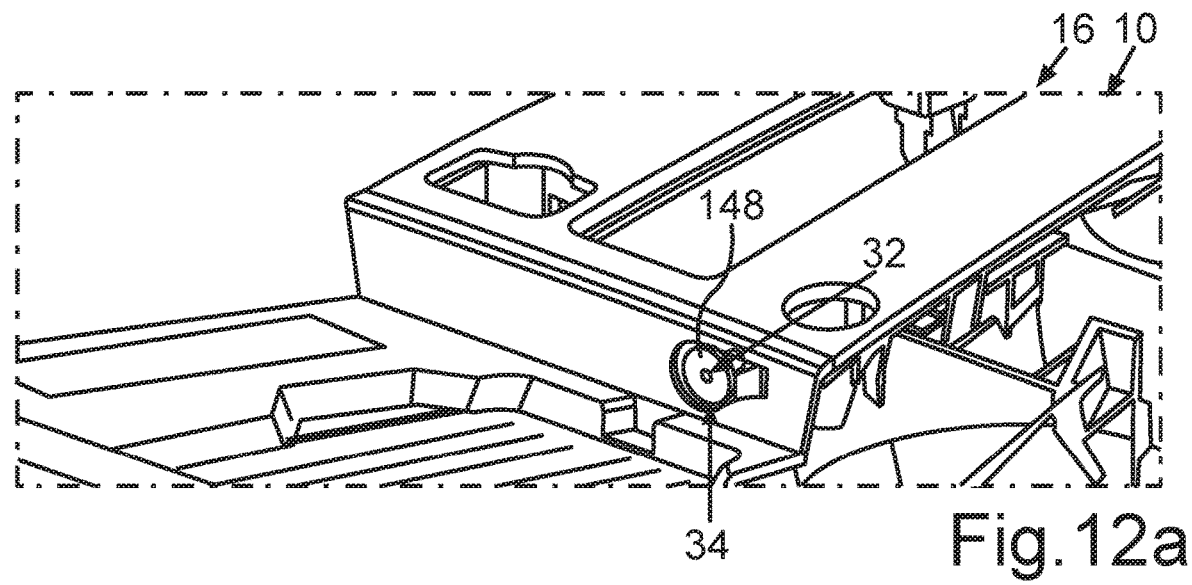
FIG. 12a a portion of a schematic perspective view of the actuating mechanism according to a ninth embodiment.
Figure 12B:
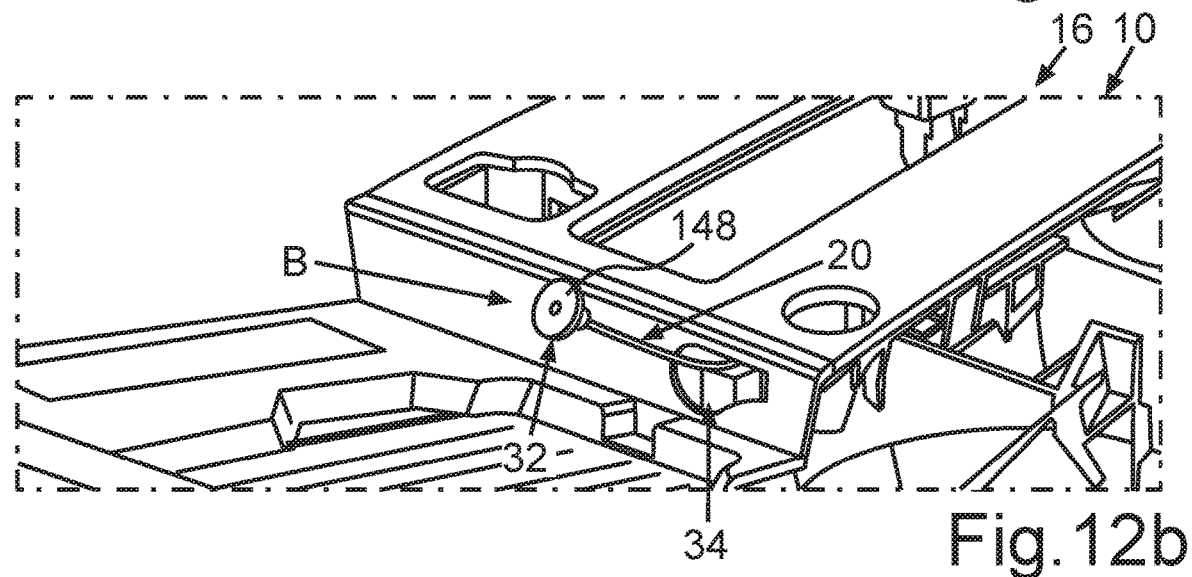
FIG. 12b a portion of a schematic perspective view of the actuating mechanism according to a ninth embodiment.

Finally, FIG. 12a, b show a ninth embodiment, in which the tool 32 is likewise designed as a tool fixed to the vehicle. Here, the tool 32 is configured as an operating element in the form of a knob 148, which is connected to the actuating element 20. In a starting position shown in FIG. 12a, the knob 148 is received in the corresponding through opening 34. In order to deactivate the parking lock, the knob 148 is pulled out from the through opening 34 and moved, especially pulled, into an activating position B, shown in FIG. 12b. In this way, the actuating element 20 is pulled and the parking lock is thereby deactivated.

In the ninth embodiment, the through opening 34 is coordinated with a cover element, for example, especially one fashioned as a lid, by means of which the through opening 34 can be closed. After removing the cover element, the head 148 can be grasped by a person, for example, and be pulled out by 100 millimeters from the through opening 34, for example, so as to pull on the actuating element 20 and thus deactivate the parking lock. The head 148 for example is a holder designed as a multifunction holder, on which objects can be held or hung, for example. In the ninth embodiment, a fixation device not represented in the figure may be provided, by means of which the activated actuating element 20, especially the cable 22, can be secured in its activated position, especially relative to the center console 10. In this way, an unwanted or spontaneous activating of the parking lock can be avoided.

The invention claimed is:

1. An actuating mechanism for actuating a gearbox emergency release of a gearbox of a motor vehicle, the actuating mechanism comprising:
 a parking lock, wherein the vehicle is mechanically locked by the parking lock when the parking lock is activated,
 at least one actuating element fixed to the vehicle, the actuating element comprising a cable, wherein the parking lock can be manually and mechanically deactivated using the cable fixed to the at least one actuating element, and
 a tool formed separate from the actuating element, wherein the actuating element can be manually and mechanically activated for the manual deactivating of the parking lock using the tool, wherein the tool further comprises a threaded spindle and at least one corresponding movement element, which can be moved by a relative rotation between the threaded spindle and the movement element in translation along the threaded spindle and relative to it, in order to thereby actuate the actuating element.

2. The actuating mechanism according to claim 1, wherein the actuating mechanism has at least one through opening, which is formed in a center console situated in the interior of the motor vehicle and has a passage direction running in a plane spanned by the vehicle transverse direction and the vehicle longitudinal direction, along which the tool can pass through the through opening, thus bringing the tool into an interaction with the actuating element, so as to mechanically actuate the actuating element by the movement element and thereby deactivate the parking lock.

3. The actuating mechanism according to claim 2, wherein the movement element can move translational relative to the center console as a result of the relative rotation between the movement element and the threaded spindle.

4. The actuating mechanism according to claim 3, wherein the passage direction runs in the transverse direction of the vehicle.

5. The actuating mechanism according to claim 3, wherein the tool is designed as a tool separate from the center console, which can be pushed along the passage direction through the through opening in order to bring the tool into interaction with the actuating element and thereby mechanically actuate the actuating element and thus deactivate the parking lock.

6. The actuating mechanism according to claim 3, wherein the tool is designed as a tool fixed to the vehicle, being supported at least indirectly on the center console and passing through the through opening in at least one position (B) in which the tool can move.

7. The actuating mechanism according to claim 3, wherein a guide mechanism is provided, comprising a first guide element provided on the tool and a second guide element secured at least indirectly on the center console, which guide element can be brought into form-fitted interaction with the first guide element for guiding of the tool when the tool is inserted through the through opening.

8. The actuating mechanism according to claim 3, wherein an operating element is rotationally fixed to the threaded spindle, having a larger outer circumference than the threaded spindle, and the threaded spindle can be turned manually by a person through the operating element.

9. The actuating mechanism according to claim 2, wherein the passage direction runs in the transverse direction of the vehicle.

10. The actuating mechanism according to claim 9, wherein the tool is designed as a tool separate from the center console, which can be pushed along the passage direction through the through opening in order to bring the tool into interaction with the actuating element and thereby mechanically actuate the actuating element and thus deactivate the parking lock.

11. The actuating mechanism according to claim 9, wherein the tool is designed as a tool fixed to the vehicle, being supported at least indirectly on the center console and passing through the through opening in at least one position (B) in which the tool can move.

12. The actuating mechanism according to claim 9, wherein a guide mechanism is provided, comprising a first guide element provided on the tool and a second guide element secured at least indirectly on the center console, which guide element can be brought into form-fitted interaction with the first guide element for guiding of the tool when the tool is inserted through the through opening.

13. The actuating mechanism according to claim 2, wherein the tool is designed as a tool separate from the center console, which can be pushed along the passage direction through the through opening in order to bring the tool into interaction with the actuating element and thereby mechanically actuate the actuating element and thus deactivate the parking lock.

14. The actuating mechanism according to claim 13, wherein a guide mechanism is provided, comprising a first guide element provided on the tool and a second guide element secured at least indirectly on the center console, which guide element can be brought into form-fitted interaction with the first guide element for guiding of the tool when the tool is inserted through the through opening.

15. The actuating mechanism according to claim 2, wherein the tool is designed as a tool fixed to the vehicle, being supported at least indirectly on the center console and passing through the through opening in at least one position (B) in which the tool can move.

16. The actuating mechanism according to claim 2, wherein a guide mechanism is provided, comprising a first guide element provided on the tool and a second guide element secured at least indirectly on the center console, which guide element can be brought into form-fitted interaction with the first guide element for guiding of the tool when the tool is inserted through the through opening.

17. The actuating mechanism according to claim 2, wherein an operating element is rotationally fixed to the threaded spindle, having a larger outer circumference than the threaded spindle, and the threaded spindle can be turned manually by a person through the operating element.

18. The actuating mechanism according to claim 1, wherein an operating element is rotationally fixed to the threaded spindle, having a larger outer circumference than the threaded spindle, and the threaded spindle can be turned manually by a person through the operating element.

19. The actuating mechanism according to claim 1, wherein the movement element has a receptacle for catching and holding the actuating element.

20. The actuating mechanism according to claim 1, wherein the actuating element comprises a fitting, which can be brought into form-fitted interaction with the movement element in order to mechanically actuate the actuating element.

* * * * *